US012494706B2

(12) United States Patent
Giuliano et al.

(10) Patent No.: US 12,494,706 B2
(45) Date of Patent: Dec. 9, 2025

(54) CHARGE PUMP AND BUCK CONVERTER FOR INTERMEDIATE BUS CONVERSION

(71) Applicant: Murata Manufacturing Co., Ltd., Kyoto (JP)

(72) Inventors: David Giuliano, Bedford, NH (US); Kazunori Tsuda, Cambridge, MA (US)

(73) Assignee: Murata Manufacturing Co., Ltd., Kyoto (JP)

( * ) Notice: Subject to any disclaimer, the term of this patent is extended or adjusted under 35 U.S.C. 154(b) by 125 days.

(21) Appl. No.: 18/503,343

(22) Filed: Nov. 7, 2023

(65) Prior Publication Data

US 2025/0149971 A1 May 8, 2025

(51) Int. Cl.
*H02M 1/00* (2007.01)
*H02M 3/07* (2006.01)
*H02M 3/158* (2006.01)

(52) U.S. Cl.
CPC ....... *H02M 1/0095* (2021.05); *H02M 1/0009* (2021.05); *H02M 1/0032* (2021.05); *H02M 3/07* (2013.01); *H02M 3/158* (2013.01); *H02M 3/1586* (2021.05)

(58) Field of Classification Search
CPC ............ H02M 1/0009; H02M 1/0032; H02M 1/0095; H02M 3/07; H02M 3/158; H02M 3/1586
See application file for complete search history.

(56) References Cited

U.S. PATENT DOCUMENTS

| | | | |
|---|---|---|---|
| 8,330,436 B2 | 12/2012 | Oraw et al. |
| 8,860,396 B2 | 10/2014 | Giuliano |
| 9,362,826 B2 | 6/2016 | Giuliano |
| 9,712,051 B2 | 7/2017 | Giuliano |
| 9,882,471 B2 | 1/2018 | Giuliano |
| 10,193,441 B2 | 1/2019 | Giuliano |
| 10,326,358 B2 | 6/2019 | Giuliano |
| 10,381,924 B2 | 8/2019 | Giuliano |
| 10,389,235 B2 | 8/2019 | Giuliano |
| 10,404,162 B2 | 9/2019 | Giuliano |
| 10,601,304 B2 | 3/2020 | McRae et al. |
| 10,680,515 B2 | 6/2020 | Giuliano |
| 10,715,036 B2 | 7/2020 | Giuliano |
| 10,917,007 B2 | 2/2021 | Giuliano |

(Continued)

FOREIGN PATENT DOCUMENTS

| | | | |
|---|---|---|---|
| WO | WO 2012/151466 A2 | 11/2012 |
| WO | WO 2016/149063 A1 | 9/2016 |
| WO | WO 2017/007991 A1 | 1/2017 |

*Primary Examiner* — Jue Zhang
(74) *Attorney, Agent, or Firm* — Haynes and Boone, LLP

(57) ABSTRACT

Disclosed embodiments include a hybrid power converter including a switched capacitor converter and a buck converter in parallel where the buck converter is operated in an open loop and non-regulated mode; the switched capacitor converter and the buck converter are connected to an input terminal, where the switched capacitor converter operates in an open loop and non-regulated mode and provides power to a load based on an input voltage, the buck converter operates in an open loop mode and provides power to the load based on the voltage of the input terminal, and the controller enables the buck converter to provide power to the load based on at least one of a voltage of the load or a current of the load.

36 Claims, 17 Drawing Sheets

(56) References Cited

U.S. PATENT DOCUMENTS

| | | |
|---|---|---|
| 10,938,300 B2 | 3/2021 | Giuliano |
| 11,211,861 B2 | 12/2021 | Giuliano |
| 11,303,205 B2 | 4/2022 | Giuliano |
| 11,316,424 B2 | 4/2022 | Giuliano |
| 11,329,552 B2 | 5/2022 | Giuliano |
| 11,422,617 B2 | 8/2022 | Wang et al. |
| 11,496,047 B2 | 11/2022 | Giuliano |
| 11,646,657 B2 | 5/2023 | Giuliano |
| 11,664,727 B2 | 5/2023 | Giuliano et al. |
| 11,764,670 B2 | 9/2023 | Giuliano |
| 11,791,723 B2 | 10/2023 | Giuliano |
| 2016/0118905 A1 | 4/2016 | Freeman et al. |
| 2018/0205315 A1 | 7/2018 | Giuliano et al. |
| 2019/0348849 A1 | 11/2019 | Kun et al. |
| 2022/0271657 A1* | 8/2022 | Rizzolatti ............... H02M 3/01 |
| 2023/0026736 A1* | 1/2023 | Liu .................... H02M 1/0095 |
| 2023/0283096 A1 | 9/2023 | Kun et al. |
| 2024/0146188 A1* | 5/2024 | Pilawa-Podgurski ........................ H02M 1/007 |

* cited by examiner

CHARGE PUMP AND BUCK CONVERTER FOR INTERMEDIATE BUS CONVERSION

FIELD

The description herein relates to the field of power supplies, and more particularly to a hybrid power converter for efficient power conversion.

BACKGROUND

Many electronic products, particularly mobile computing and/or communication products and components (e.g., notebook computers, ultra-book computers, tablet devices, LCD and LED displays), require multiple DC (direct current) voltage levels. For example, radio frequency transmitter power amplifiers may require relatively high voltages (e.g., 12V or more), and control circuitry may require a low voltage level (e.g., 1-2V). Some other circuitries may require an intermediate voltage level (e.g., 5-10V). Power converters are often used to generate a lower or higher voltage from a common power source, such as a battery, in order to meet the power requirements of different components in the electronic products.

SUMMARY

Embodiments consistent with the present disclosure provide systems, methods, and devices for a hybrid power converter.

The presently disclosed embodiments may include an apparatus for a hybrid power converter including a switched capacitor converter and a buck converter in parallel where the buck converter is operated in an open loop and non-regulated mode. The apparatus may include a switched capacitor converter connected to an input terminal, the switched capacitor converter comprising a plurality of capacitors interconnected by a plurality of switches, a buck converter connected to the input terminal, the buck converter comprising an inductor and a plurality of switches connected to the inductor, a controller comprising a voltage detector circuit and a current detector circuit wherein the switched capacitor converter operates in an open loop and non-regulated mode and provides power to a load of the hybrid power converter based on an input voltage at the input terminal, the buck converter operates in an open loop mode and provides power to the load based on the voltage of the input terminal, the voltage detector circuit measures a voltage of the load, the current detector circuit measures at least one of a current of the switched capacitor converter, a current of the buck converter, or a current of the load and the controller enables the buck converter to provide power to the load based on at least one of the voltage of the load or the current of the load.

The presently disclosed embodiments may include an apparatus for a hybrid power converter including a switched capacitor converter and a buck converter in parallel where the buck converter is operated in a regulated mode. The apparatus may include a switched capacitor converter connected to an input terminal, a buck converter connected to the input terminal, a controller comprising a voltage detector circuit and a current detector circuit wherein the switched capacitor converter operates in an open loop and non-regulated and provides power to a load of the hybrid power converter based on an input voltage at the input terminal, the buck converter operates in a regulated mode and provides power to the load based on the input voltage, the voltage detector circuit measures a voltage of the load, the current detector circuit measures at least one of a current of the switched capacitor converter, a current of the buck converter, or a current of the load and the controller enables the buck converter to provide power to the load based on at least one of the voltage of the load or the current of the load.

The presently disclosed embodiments may include an apparatus for a hybrid power converter including a switched capacitor converter and a buck converter in parallel where the buck converter is operated in a peak current mode. The apparatus may include a switched capacitor converter connected to an input terminal, a buck converter connected to the input terminal, a controller comprising a voltage detector circuit and a current detector circuit wherein the switched capacitor converter operates in an open loop and non-regulated and provides power to a load of the hybrid power converter based on an input voltage at the input terminal, the buck converter operates in a peak current mode and provides power to the load based on the input voltage, the voltage detector circuit measures a voltage of the load, the current detector circuit measures at least one of a current of the switched capacitor converter, a current of the buck power converter current, or a current of the load and the controller enables the buck converter to provide power to the load based on at least one of the voltage of the load or the current of the load.

The presently disclosed embodiments may include an apparatus for a hybrid power converter including a switched capacitor converter and a buck converter in parallel where the buck converter is operated in a peak current regulated mode. The apparatus may include a switched capacitor converter connected to an input terminal, a buck converter connected to the input terminal, a controller comprising a voltage detector circuit and a current detector circuit wherein the switched capacitor converter operates in an open loop and non-regulated and provides power to a load of the hybrid power converter based on an input voltage at the input terminal, the buck converter operates in a peak current regulated mode and provides power to the load based on the input voltage, the voltage detector circuit measures a voltage of the load and the current detector circuit measures at least one of a current of the switched capacitor converter, a current of the buck converter, and a current of the load and the controller enables the buck converter to provide power to the load based on at least one of the voltage of the load or the current of the load.

The presently disclosed embodiments may include an apparatus for a hybrid power converter including a switched capacitor converter and a buck converter in parallel where the buck converter is operated based on voltage mode control. The apparatus may include a switched capacitor converter connected to an input terminal, a buck converter connected to the input terminal, a controller comprising a voltage detector circuit and a current detector circuit wherein the switched capacitor converter operates in an open loop and non-regulated and provides power to a load of the hybrid power converter based on an input voltage at the input terminal, the buck converter operates in a voltage mode control and provides power to the load based on the input voltage, the voltage detector circuit measures a voltage of the load and the current detector circuit measures at least one of a current of the switched capacitor converter, a current of the buck converter, and a current of the load and the controller enables the buck converter to provide power to the load based on at least one of the voltage of the load voltage or the current of the load.

The presently disclosed embodiments may include an apparatus for a hybrid power converter including a switched capacitor converter and a buck converter in parallel where the buck converter is operated based on voltage mode control where the output resistance of the buck converter is less than the output resistance of the switched capacitor converter. The apparatus may include a switched capacitor converter connected to an input terminal, a buck converter connected to the input terminal, a controller comprising a voltage detector circuit and a current detector circuit wherein the switched capacitor converter operates in an open loop and non-regulated and provides power to a load of the hybrid power converter based on an input voltage at the input terminal, the buck converter provides power to the load based on the input voltage, the buck converter comprises an output resistance that is less than an output resistance of the switched capacitor converter, the voltage detector circuit measures a voltage of the load voltage, the current detector circuit measures at least one of a current of the switched capacitor converter, a current of the buck converter, and a current of the load and the controller enables the buck power converter to provide power to the load based on at least one of the voltage of the load or the current of the load.

The foregoing general description and the following detailed description are exemplary and explanatory only and are not restrictive of the claims.

BRIEF DESCRIPTION OF THE DRAWINGS

Reference is made in the following detailed description to accompanying drawings, which form a part hereof, wherein like numerals may designate like parts throughout that are corresponding and/or analogous.

DETAILED DESCRIPTION

Figure 1A:
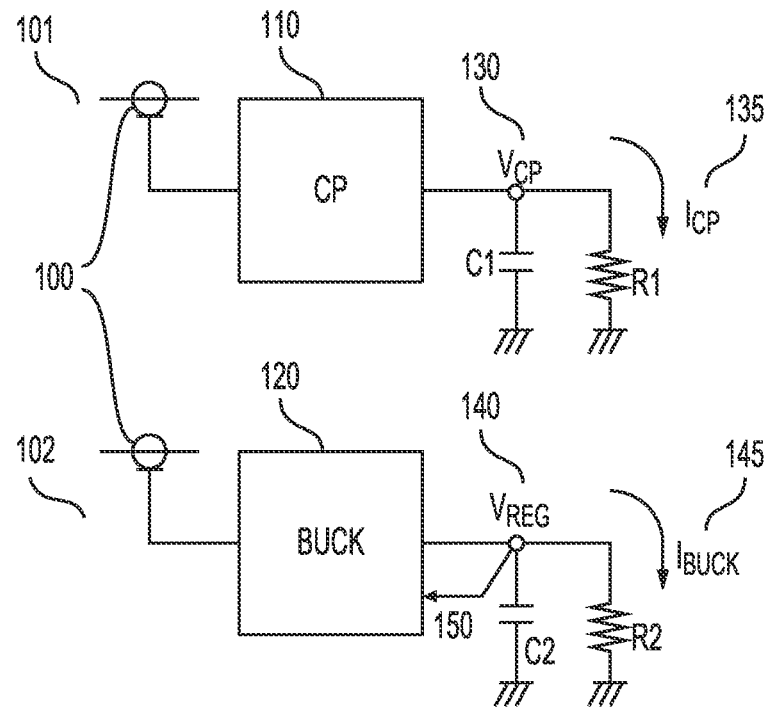
FIG. 1A shows a block diagram representative of two power converter solutions.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims. Other features, objects, and advantages of the invention will be apparent from the description and drawings, and from the claims.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

It will be appreciated that the figures have not necessarily been drawn to scale, such as for simplicity and/or clarity of illustration. For example, dimensions of some aspects may be exaggerated relative to others. Further, it is appreciated that other embodiments may be utilized. Furthermore, structural and/or other changes may be made without departing from claimed subject matter. References throughout this specification to "subject matter" refer to subject matter intended to be covered by one or more implementations, or any portion thereof, and are not necessarily intended to refer to a complete implementation, to a particular combination of implementation, or to any portion thereof. It should also be noted that directions and/or references, for example, such as up, down, top, bottom, and so on, may be used to facilitate discussion of drawings and are not intended to restrict application of particular subject matter. Therefore, the following detailed description is not to be taken to limit subject matter and/or equivalents thereof.

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of subject matter. Thus, appearances of such phrases, for example, in various places throughout this specification are not necessarily intended to refer to the same implementation and/or embodiment or to any one particular implementation and/or embodiment. Furthermore, it is appreciated that particular features, structures, characteristics, and/or the like described are capable of being combined in various ways in one or more implementations and/or embodiments and, therefore, are within intended scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Nonlimiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Many power converters include switches and one or more capacitors that are used, for example, to power portable electronic devices and consumer electronics. Switch-mode power converters regulate the output voltage or current by switching energy storage elements (e.g., inductors and capacitors) into different electrical configurations using a switch network. Switched capacitor converters are switch mode power converters that primarily use capacitors to transfer energy. In such converters, the number of capacitors and switches increases as the transformation ratio increases. Switches in the switch network are usually active devices that are implemented with transistors. The switch network may be integrated on a single or on multiple monolithic semiconductor substrates, or formed using discrete devices.

In electrical power conversion, a system load may operate in a wide range of power consumption. For example, a computer system including a CPU and computer components may draw power from a power supply between 0 to 10 amp range, and a switched capacitor converter (e.g., charge pump or CP) may be adequate to provide power to the CPU for the majority of the range of power consumption. The switched capacitor converter may offer higher efficiency over a larger efficiency range, however at high power consumption (e.g., higher current draw by the load), the switched capacitor converter may be an expensive solution due to the switches and number of capacitors. Further, in the high efficiency range (i.e., light power consumption), the switched capacitor converter may be less sensitive to the selection of the inductor used to provide a wider set of options for size (e.g., low profile) and cost reduction in the design. A different type of power converter may provide better efficiency at higher power consumption than a switched capacitor design.

For example, a buck converter design based on two switches and an inductor may offer a lower cost solution at higher power consumption. The buck converter may be optimized for a high efficiency over a smaller window in comparison to the switched capacitor converter. However, in some cases, the buck converter may not be a good solution at lower power consumption. For example, the buck converter design may require an optimized inductor for the use case to cover a wider range of power consumption and maintain a higher efficiency over the wider range.

The embodiments described herein provides a way to achieve higher efficiency power conversion across a range from light loads to heavy loads during operation of a power supply. For example, disclosed embodiments are directed to providing a new approach for a hybrid power converter that includes a buck power converter and a switched capacitor converter in parallel where a controller may control the use of both converters to improve efficiency of power conversion across the range of loads on the power supply from a light load to a heavy load. FIG. 1A shows a block diagram of a first power converter solution 101 and a second power converter solution 102. In some embodiments, first power converter solution 101 may include a switched capacitor converter 110, a capacitor C1, and a resistor R1. In some embodiments, second power converter solution 102 may include a buck converter 120, a capacitor C2, a resistor R2, and a feedback line 150. In some embodiments, input voltage 100 may be provided to switched capacitor converter 110 and buck converter 120. In the block diagram, power converter solutions 101 and 102 may be operating independently wherein switched capacitor converter 110 may provide output voltage 130 and supply load current 135 and wherein buck converter 120 may provide output voltage 140 and supply load current 145.

Figure 1B:
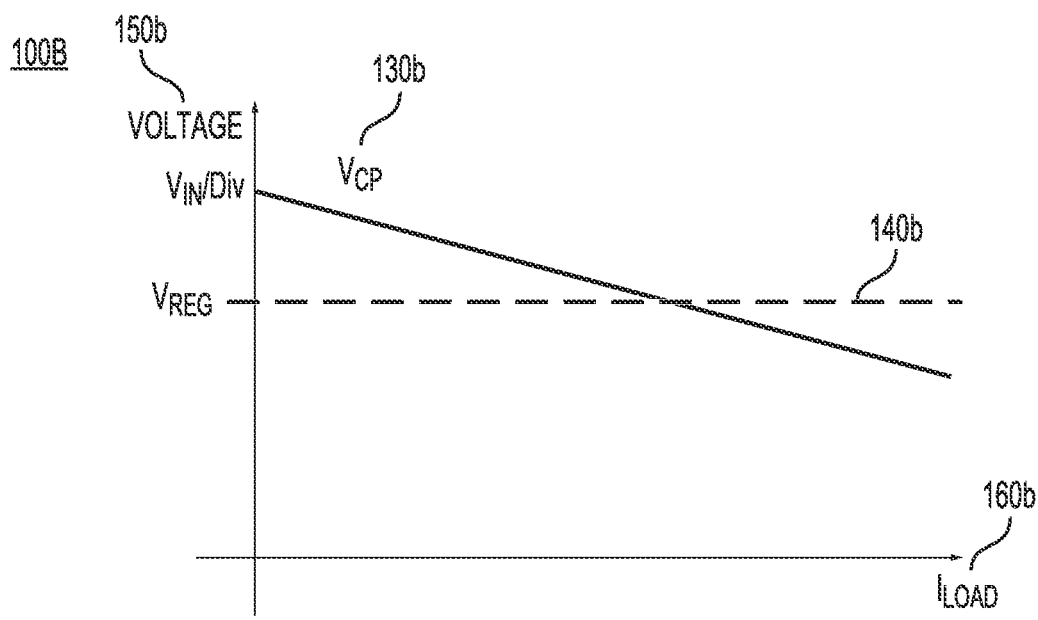
FIG. 1B shows a graph of the expected output voltage for a given input voltage based on a load current for the power converter solutions of FIG. 1A.

FIG. 1B shows a graph 100B of the expected output voltage 150b for a given input voltage 100 based on load current 160b for each converter of FIG. 1A. It is to be appreciated that the output voltage 130 for the switched capacitor converter 110 may have a slope 130b based on load current 160b due to the output resistance of the switched capacitor converter 110. Further, the slope may change as the input voltage 100 decreases (e.g., battery voltage goes lower due to battery drain). It is to be further appreciated that the output voltage 140b for the buck converter 120 may be regulated and may be mostly consistent over the range of load current 160b. Thus, the output characteristics and operation of the two power converters may be different based on the characteristics of the load to which they are delivering power.

In some disclosed embodiments of the apparatus described herein, to take advantage of the benefits of each power converter type, a switched capacitor converter and a buck converter may be used in parallel with a controller configured to control the converters to provide higher efficiency power conversion (e.g., hybrid power converter). In some examples where the controller may determine lower power consumption by a load, the controller may enable the switched capacitor converter and disable the buck converter. In some examples where the controller may determine higher power consumption by the load, the controller may disable the switched power converter and enable the buck converter. Furthermore, in some examples the controller may determine the power consumption by the load may have a higher efficiency if both converters may be used and as such may enable both the switched power converter and the buck converter to share the load. It is to be appreciated that the methods of controlling the hybrid power converter proposed in this disclosure may be applied in any manner to provide higher efficiency power conversion as compared to a single converter.

In one exemplary example, in laptop systems with 4S-2S batteries, a switched capacitor converter may provide a higher efficiency intermediate bus conversion for low and medium loads such as a CPU, memory, I/O and other components typically used in a computer system. At heavy loads, a buck converter may be enabled to provide higher efficiency power conversion. In addition to providing higher efficiency power conversion, the size of the inductor for the buck converter may be reduced with coupled inductors. The coupled inductors may also provide ripple cancellation. In some embodiments, an adiabatic switched capacitor converter may be used to reduce the overall capacitance of the switched capacitor converter. In some embodiments, the design may provide prevention of reverse current flow when the switched capacitor converter voltage is greater than the buck converter voltage.

Figure 1C:
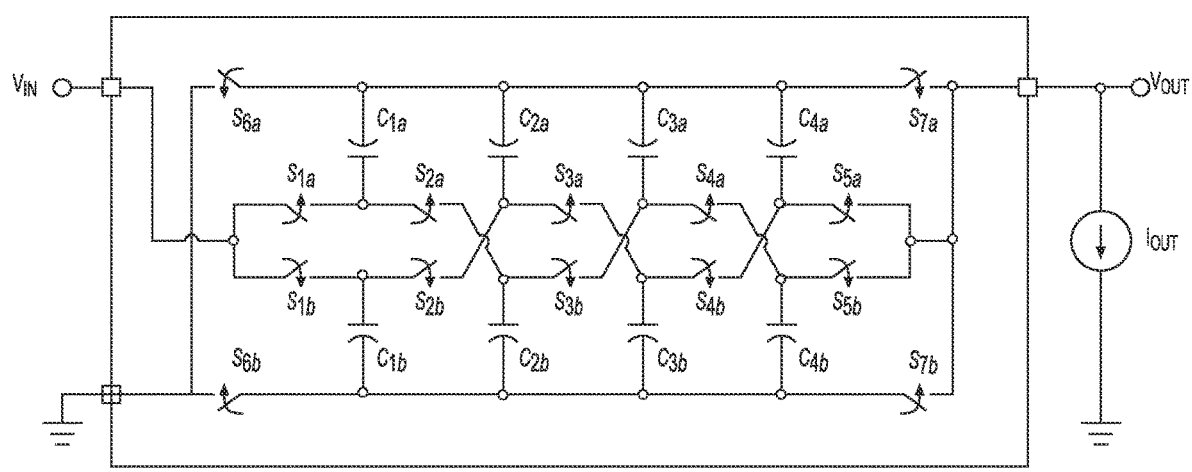
FIG. 1C shows a schematic diagram of an exemplary two-phase charge pump with a voltage source and current load, consistent with embodiments of the present disclosure.

FIG. 1C shows a schematic diagram of an exemplary two-phase 5:1 charge pump 100C with a voltage source and current load, consistent with embodiments of the present disclosure. Charge pump 100C may be configured to nominally provide a 5:1 (i.e., M=5) step-down in voltage such that the output voltage $V_{OUT}$ (volts) is one-fifth of an input voltage $V_{IN}$ (volts). The output terminal of the charge pump 100C may be coupled to a current load with current $I_{OUT}$. Two-phase 1:5 (M=5) cascade multiplier type charge pump 100C may include fourteen switches labeled $S_{1a}$ to $S_{7b}$ and eight capacitors labeled $C_{1a}$ to $C_{4b}$. The configurations for the switches in one possible four-state approach (with states labeled 1a, 1b, 2a, 2b) are shown in the table below:

| | Switch | | | | | | | | | | | | | |
| --- | --- | --- | --- | --- | --- | --- | --- | --- | --- | --- | --- | --- | --- | --- |
| State | $S_{1a}$ | $S_{1b}$ | $S_{2a}$ | $S_{2b}$ | $S_{3a}$ | $S_{3b}$ | $S_{4a}$ | $S_{4b}$ | $S_{5a}$ | $S_{5b}$ | $S_{6a}$ | $S_{6b}$ | $S_{7a}$ | $S_{7b}$ |
| State 1a | 1 | 0 | 0 | 1 | 0 | 1 | 0 | 1 | 0 | 0 | 0 | 1 | 1 | 0 |
| State 1b | 0 | 0 | 0 | 1 | 0 | 1 | 0 | 1 | 0 | 1 | 0 | 1 | 1 | 0 |
| State 2a | 0 | 1 | 1 | 0 | 1 | 0 | 1 | 0 | 0 | 0 | 1 | 0 | 0 | 1 |
| State 2b | 0 | 0 | 1 | 0 | 1 | 0 | 1 | 0 | 1 | 0 | 1 | 0 | 0 | 1 |

It is to be appreciated the timing of each section is 90° out of phase, such that one section has the switch configuration of state 1a while the other section has the switch configuration of state 1b, and so forth. In the parallel arrangement of FIG. 1C, the average input current is $0.2*I_{OUT}=I_{OUT}/M$ in each cycle of operation. This approach is applicable to a wide range of charge pump topologies.

Figure 2A:
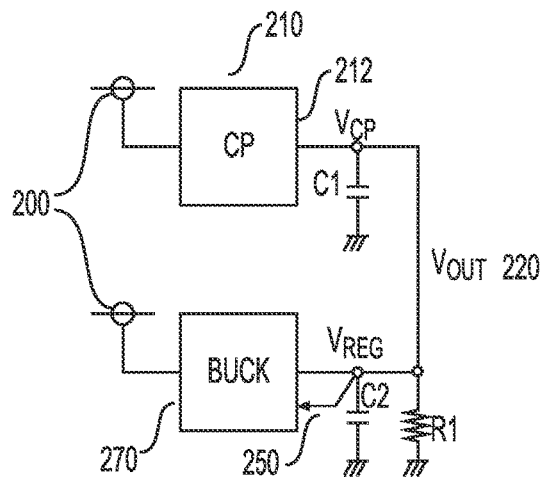
FIG. 2A shows a block diagram representative of an exemplary hybrid power converter, consistent with embodiments of the present disclosure.

FIG. 2A shows a block diagram representative of the hybrid power converter 210, consistent with embodiments of the present disclosure. In some embodiments, an output voltage 220 provided by at least one of a switched capacitor converter 212 or a buck converter 270 may be based on input voltage 200 provided to both the switched capacitor converter 212 and buck converter 270. Switched capacitor converter 212 may include a capacitor C1. Buck converter 270 may include a capacitor C2 and a feedback line 250.

Figure 2B:
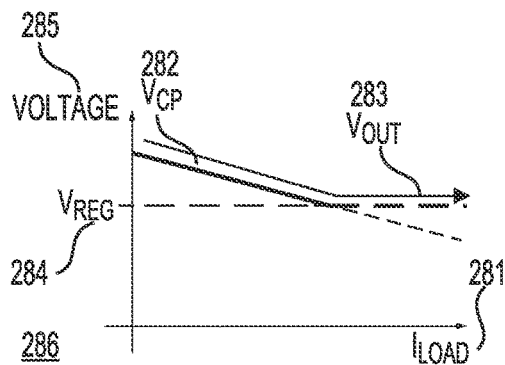
FIG. 2B shows a graph associated with the hybrid power converter of FIG. 2A, consistent with embodiments of the present disclosure.

FIG. 2B shows a graph 286 associated with hybrid power converter 210 of FIG. 2A, consistent with embodiments of the present disclosure. Graph 286 shows voltage 285 with respect to current load $I_{LOAD}$ 281. Curve 282 may correspond to a voltage of switched capacitor converter 212 ($V_{IN}$/DivN) and curve 284 may correspond to a voltage of a regulated buck converter 270. In some embodiments, output voltage 220 may be shown by curve 283. As shown by curve 283, output voltage 220 may be provided by at least one of switched capacitor converter 212 or buck converter 270.

Figure 2C:
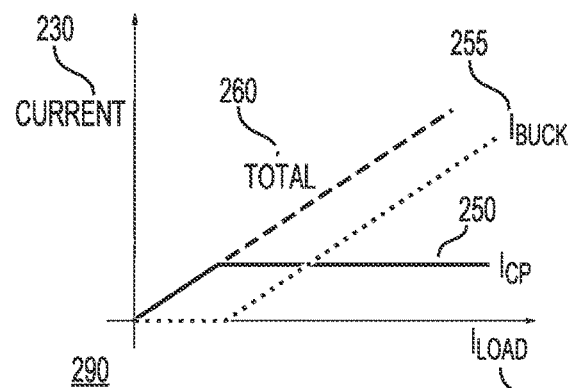
FIG. 2C shows a graph associated with the hybrid power converter of FIG. 2A, consistent with embodiments of the present disclosure.

FIG. 2C shows a graph 290 associated with hybrid power converter 210 of FIG. 2A, consistent with embodiments of the present disclosure. Graph 290 shows that output current 230 may be based on load current $I_{LOAD}$ 240, the total supplied current 260 may be based on the supplied switched capacitor current 250, the supplied buck converter current 255, or a combination of the two converters (e.g., load sharing).

Figure 2D:
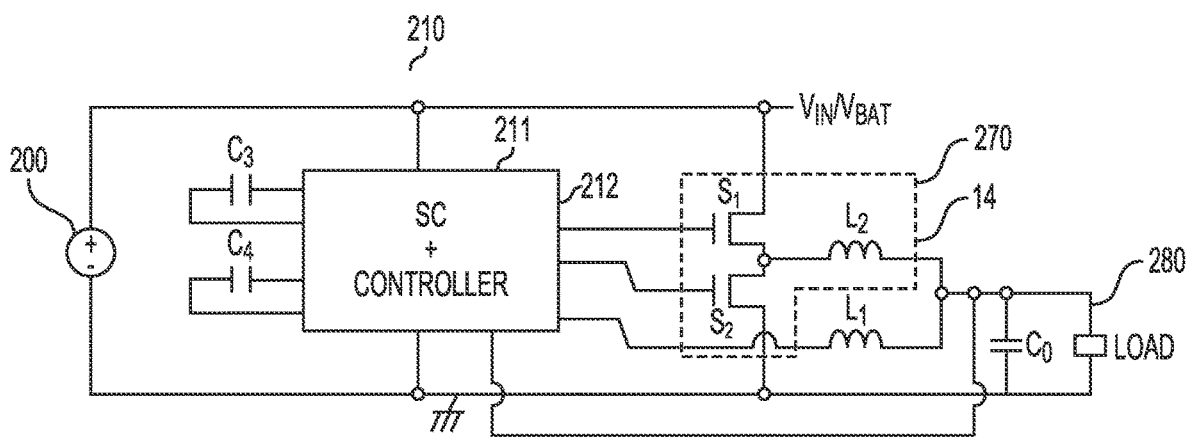
FIG. 2D shows a graph associated with the hybrid power converter of FIG. 2A, consistent with embodiments of the present disclosure.

FIG. 2D shows a block diagram representative of the hybrid power converter 210 of FIG. 2A, consistent with embodiments of the present disclosure. Hybrid power converter 210 may include input voltage 200, capacitor $C_0$, capacitor $C_3$, capacitor $C_4$, switch $S_1$ (e.g., transistor), switch $S_2$ (e.g., transistor), inductor $L_1$, inductor $L_2$, control system 211, switched capacitor converter 212, buck converter 270, and load 280. Control system 211 may control the hybrid power converter 210 to determine how total supplied current 260 of FIG. 2C may be provided to load 280 based on measurements of current and voltage of the load. In some embodiments, control system 211 may include a controller and the switched capacitor converter 212. Thus, the switched capacitor converter and buck converter combination controller may implement the disclosed hybrid power converter 210. Note that output inductor L2 of the buck converter 270 may be used to implement the hybrid power converter 210. The controller may determine if a voltage of the switched capacitor converter 212 falls below a threshold to determine if there is a heavy load, and thus enable the buck converter 270. In some embodiments, the controller may determine which power converter to enable/disable. For example, under light load the controller may determine to use only the switched capacitor converter 212. Under medium load, the controller may determine to use both the switched capacitor converter 212 and the buck converter 270. Under heavy load, the controller may determine to use the buck converter 270 only. It is to be appreciated that in some embodiments, under heavy load, the switched capacitor converter 212 may be operated together with the buck converter 270, similar to medium load conditions. The mode of operation of the buck converter 270 may be modified (CCM, DCM, pulse skipping) depending on design (e.g., intended operation) of the hybrid power converter 210.

Figure 3A:
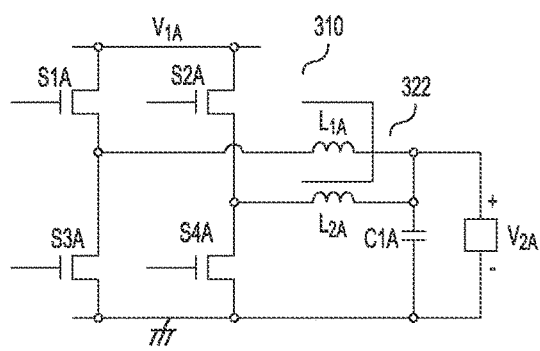
FIG. 3A shows an exemplary buck converter, consistent with embodiments of the present disclosure.

FIG. 3A shows an exemplary buck converter 310 with a 2-phase coupled inductor 322, switches S1A-S4A (e.g., transistors), capacitor C1A, voltage $V_{1A}$, and voltage $V_{2A}$, consistent with embodiments of the present disclosure. FIG. 3B shows an exemplary buck converter 320 with a 3-phase coupled inductor 324, switches S1B-S6B (e.g., transistors), capacitor C1B, voltage $V_{1B}$, and voltage $V_{2B}$, consistent with embodiments of the present disclosure.

Figure 3C:
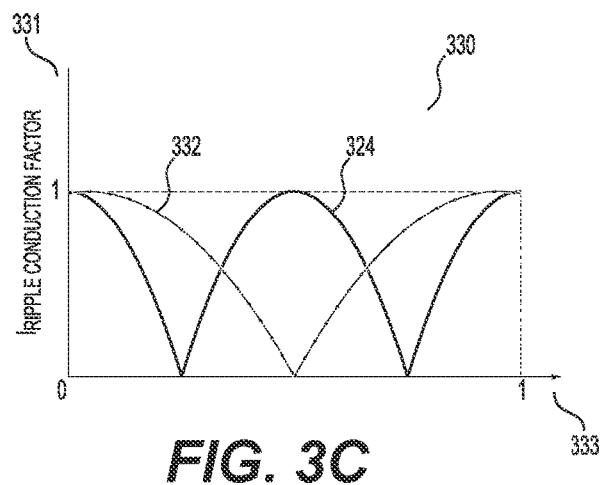
FIG. 3C shows an exemplary graph of reducing ripple current in the buck converter of FIGS. 3A and 3B, consistent with embodiments of the present disclosure.
Figure 3B:
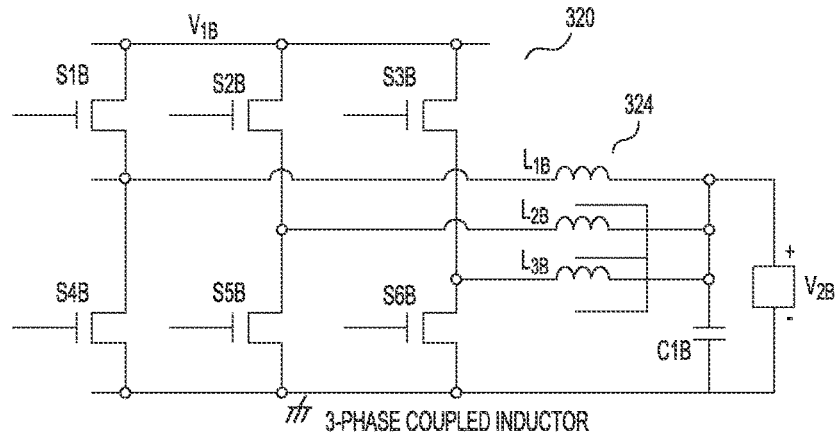
FIG. 3B shows an exemplary buck converter, consistent with embodiments of the present disclosure.

FIG. 3C shows a graph 330 with examples of reducing ripple current in the buck converter (e.g., buck converter 310 of FIG. 3A, buck converter 320 of FIG. 3B), consistent with embodiments of the present disclosure. Graph 330 shows ripple conduction factor current 331 with respect to duty cycle 333. Ideally, complete current ripple cancellation for an N-phase inductor may be possible with proper control of the duty cycle due to the coupling of inductors. For example, complete ripple cancellation may be possible with 2-phase inductor 322 using ½ duty cycle control. In another example, complete ripple cancellation may be possible with 3-phase inductor 324 using ⅓ and ⅔ duty cycle control. The height of the inductor may be reduced based on this solution requiring less leakage inductance.

Figure 4A:
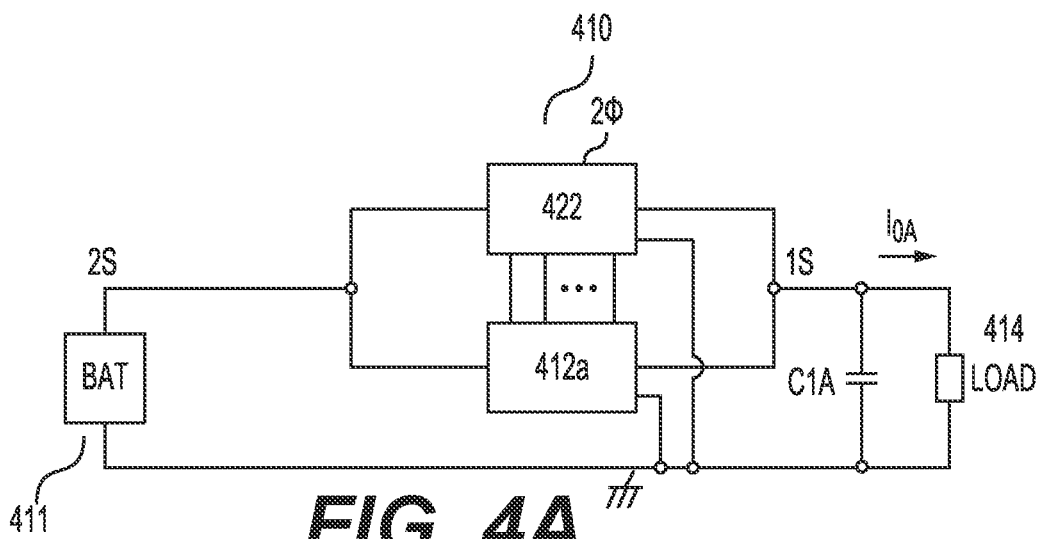
FIG. 4A illustrates an exemplary hybrid power converter solution, consistent with embodiments of the present disclosure.
Figure 4B:
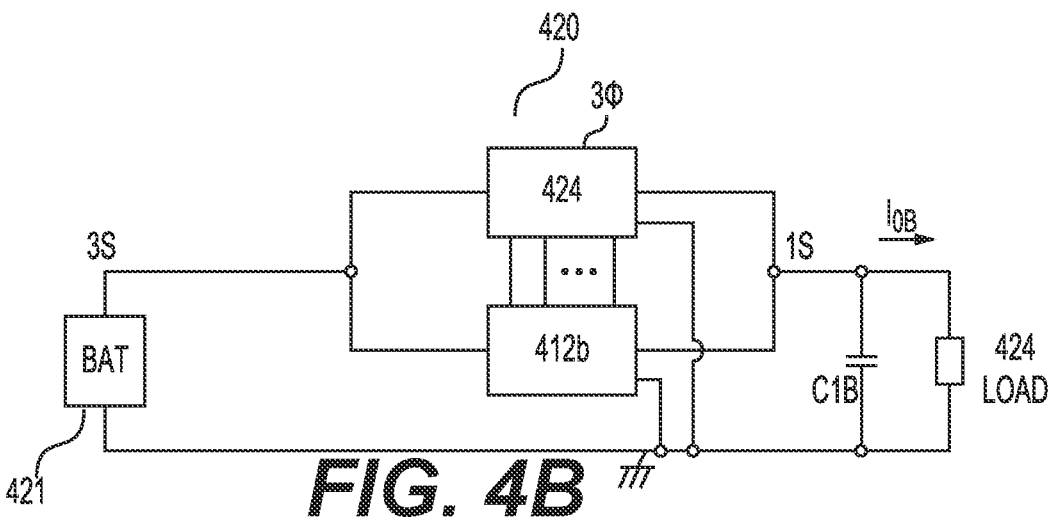
FIG. 4B illustrates an exemplary hybrid power converter solution, consistent with embodiments of the present disclosure.

FIG. 4A illustrates a 2S hybrid power converter solution and FIG. 4B illustrates a 3S hybrid power converter solution, each implementing ripple current reduction, consistent with embodiments of the present disclosure. 2S converter 410 shows a system with a 2S battery input 411, a switched capacitor converter 412a in parallel with a 2-phase buck converter 422, capacitor C1A, and load 414. It is to be appreciated that the switched capacitor converter 412a may include N phases (e.g., 2-phase switched capacitor converter). 2S battery input 411 becomes 1S at the shared capacitor C1A and load 414 node, due to a division ratio of 2 of the switched capacitor converter 412a. 3S converter 420 shows a system with a 3S battery input 421, a switched capacitor converter 412b in parallel with a 3-phase buck converter 424, capacitor C1B, and load 424. It is to be appreciated that the ripple current may be reduced based on inductor selection and duty cycle control (e.g., as shown in chart 330 of FIG. 3C).

Figure 4C:
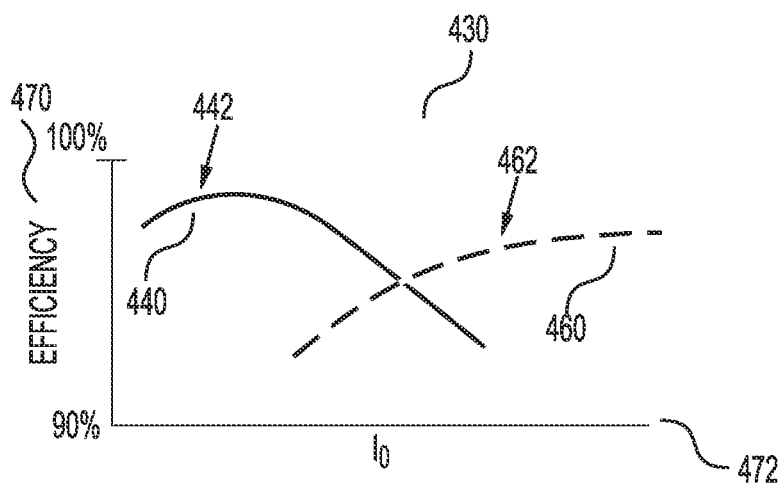
FIG. 4C shows an efficiency chart, consistent with embodiments of the present disclosure.

FIG. 4C shows a chart 430 of efficiency 470 with respect to load current 472, consistent with embodiments of the present disclosure. In some disclosed embodiments of the apparatus described herein, as shown by chart 430, to take advantage of the benefits of each power converter type, a switched capacitor converter (e.g., switched capacitor converter 412a of FIG. 4A, switched capacitor converter 412b of FIG. 4B) and a buck converter (e.g., buck converter 422 of FIG. 4A, buck converter 424 of FIG. 4B) may be used in parallel with a controller configured to control the converters to provide higher efficiency power conversion (e.g., in a hybrid power converter). In some examples where the controller may determine lower power consumption by a load (e.g., based on load current $I_0$), the controller may enable the switched capacitor converter and disable the buck converter (e.g., at point 442 where curve 440 corresponding to the efficiency of a switched capacitor converter shows a higher efficiency at a lower load current $I_0$, the switched capacitor converter may be enabled). In some examples where the controller may determine higher power consumption by the load, the controller may disable the switched power converter and enable the buck converter (e.g., at point 462 where curve 460 corresponding to the efficiency of a buck converter shows a higher efficiency at a higher load current $I_0$, the switched capacitor converter may be disabled and the buck converter may be enabled). Furthermore, in some examples the controller may determine the power consumption by the load may have a higher efficiency if both converters may be used and as such may enable both the switched power converter and the buck converter to share the load. It is to be appreciated that the methods of controlling the hybrid power converter proposed in this disclosure may be applied in any manner to provide higher efficiency power conversion as compared to a single converter.

Consistent with disclosed embodiments, inductive (e.g., buck converter) and capacitive converters (e.g., switched capacitor converter or charge pump) may be in parallel to improve efficiency over all load current conditions. Using two different types of converters, a controller may need to manage the system operation. The switched capacitor converter may be operated as a bus converter, open loop, non-regulated. The buck converter may be operated in a number of different modes. In some embodiments, the buck converter may be operated in open loop mode in a similar manner as the switched capacitor converter. This mode of operation may be a configuration wherein the switched capacitor converter may provide an output voltage that may be a divider of the input voltage and the buck converter may provide an output voltage based on a duty cycle and the input voltage. This configuration may be controlled by setting the output voltage of the hybrid power converter based on the input voltage.

For example, when the output voltage of the switched capacitor converter is greater than the output voltage of the buck converter, the load may be supplied by the switched capacitor converter. When it is less, the output may be supplied by the buck converter. In another mode of operation, the buck converter may have voltage/current feedback (e.g., voltage-mode, peak-current mode). In this mode, the output voltage may not droop as compared with the open-loop mode. When the output voltage of the switched capacitor converter is greater than the output voltage of the buck converter, a reference voltage may be controlled over different input voltages. For example, the reference voltage of the buck converter may be a function of the input voltage.

Figure 5:
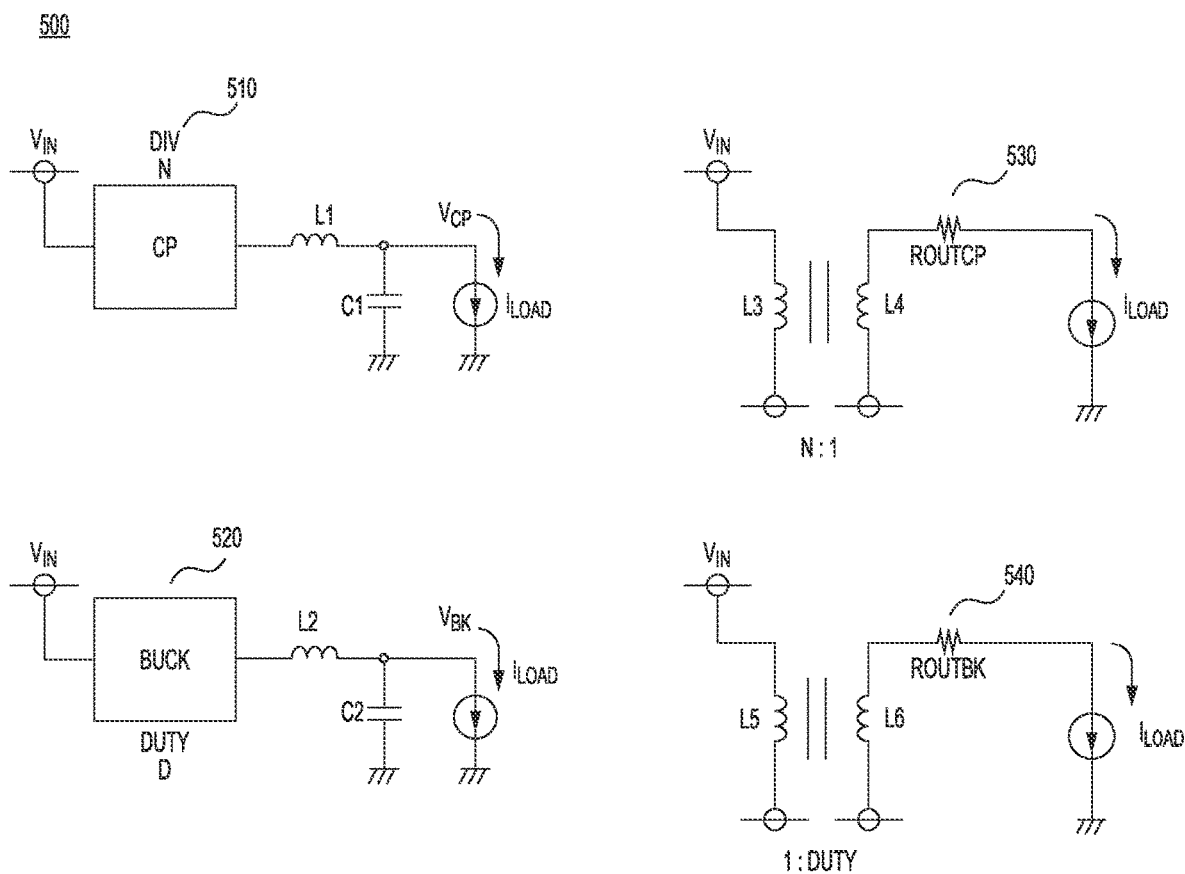
FIG. 5 shows components and the operation of an exemplary hybrid power converter, consistent with embodiments of the present disclosure.

FIG. 5 shows components and the operation of a hybrid power converter 500 where the mode of operation includes the switched capacitor converter and the buck converter operating in open loop mode, consistent with embodiments of the present disclosure. In some embodiments, switched capacitor converter 510 may provide an output inductance L1 and an output voltage $V_{CP}$ that may be defined by a division ratio of $V_{IN}$ divided by N (e.g., DIV N). The switched capacitor converter 510 corresponds to the switched capacitor converter model 530, where the switched capacitor converter of 510 may be modeled by an N:1 transformer including an inductor L3 and an inductor L4. An associated output resistance ROUTCP is shown coupled to the current load $I_{LOAD}$. Buck converter 520 may provide an output voltage $V_{BK}$ that is based on duty cycle D of the buck converter 520 and $V_{IN}$. The buck converter 520 corresponds to the buck converter model 540, where the buck converter 520 may be modeled by a 1: Duty transformer including an inductor L5 and an inductor L6. An associated output resistance ROUTBK is shown coupled to the current load $I_{LOAD}$.

Figure 6A:
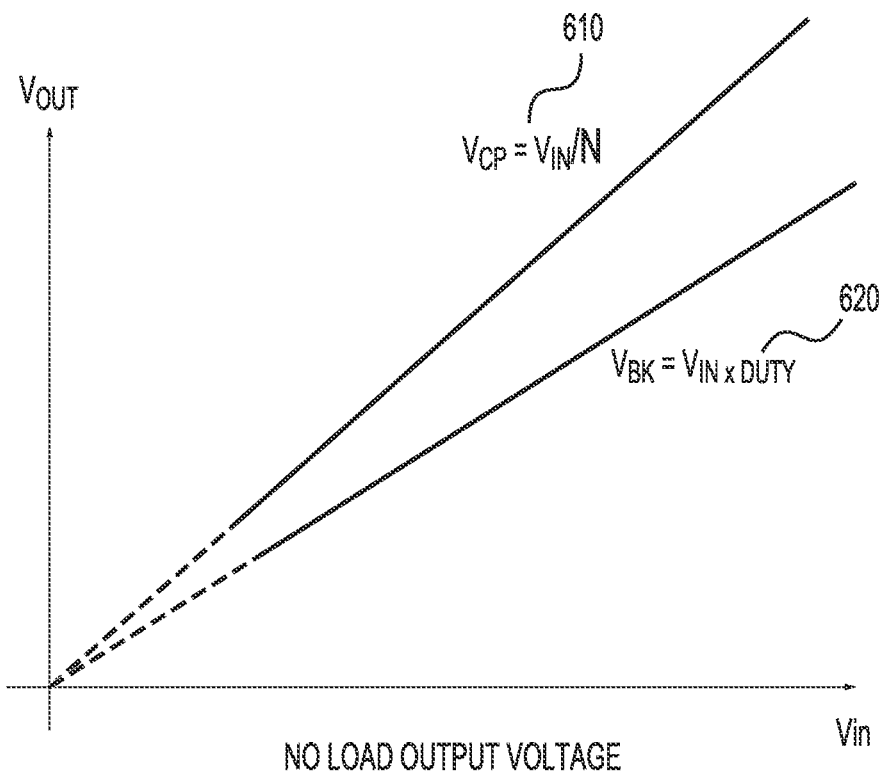
FIG. 6A shows an exemplary graph associated with the hybrid power converter of FIG. 5, consistent with embodiments of the present disclosure.

FIG. 6A shows curves indicative of a case of no load output voltage $V_{OUT}$ with respect to input voltage $V_{IN}$ for switched capacitor converter 510 and buck converter 520 in open loop mode, consistent with embodiments of the present disclosure. Consistent with the operations described in FIG. 5, output voltage $V_{CP}$ 610 of the switched capacitor converter 510 may be a fixed division of the input voltage and output voltage $V_{BK}$ 620 may be based on the duty cycle of the buck converter 520.

Figure 6B:
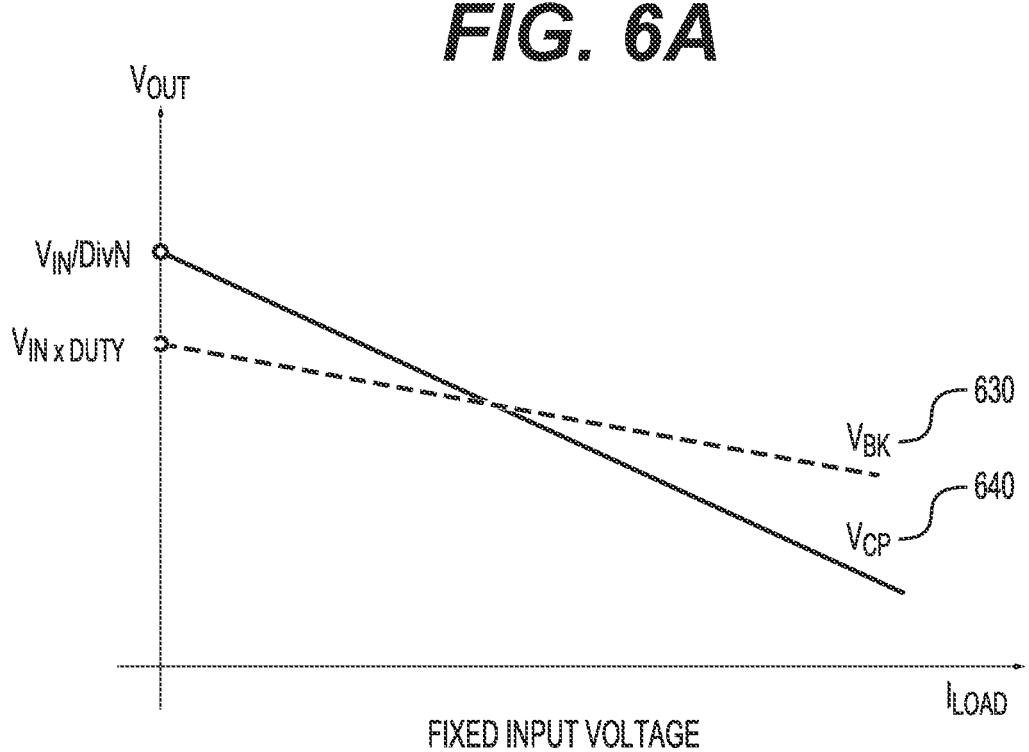
FIG. 6B shows an exemplary graph associated with the hybrid power converter of FIG. 5, consistent with embodiments of the present disclosure.

FIG. 6B shows curves indicative of a fixed input voltage $V_{IN}$ with both converters in open loop mode wherein output voltage $V_{CP}$ 640 may change with respect to the load current $I_{LOAD}$ and output resistance of the switched capacitor converter 510 and output voltage $V_{BK}$ 630 may change with respect to the output resistance of the buck converter 520 and the load current $I_{LOAD}$, consistent with embodiments of the present disclosure.

The switched capacitor converter 510 and buck converter 520 parallel operation may include the following control methodology in different modes of operation. In the power stage, the switched capacitor converter divide ratio may decide the maximum output voltage of the switched capacitor converter (e.g., $V_{CP}$ at no load). The switched capacitor converter may act as a bus converter with an equivalent output resistance as ROUTCP 530. For example, the output voltage $V_{CP}$ of the switched capacitor converter 510 may be described by the following expression:

$$V_{CP}(I_{LOAD}) = \frac{V_{IN}}{DIV} - ROUTCP \cdot I_{LOAD}$$

The buck converter target output voltage $V_{BK}$ 630 may be controlled by the duty cycle, as described in by the following expression:

$$V_{BK}(0A) = V_{IN} \cdot BuckDuty$$

If the buck duty cycle ("BuckDuty") is fixed, $V_{BK}$ 630 may be expressed similarly to $V_{CP}$, as described in the following expression:

$$V_{BK} = V_{IN} \cdot BuckDuty - ROUTBK \cdot I_{LOAD}$$

In the parallel operation, the switched capacitor converter 510 may be used for light loads and the buck converter 520 may be used for heavier loads. The buck converter 520 may be turned on when a heavy load is detected. The buck converter 520 may be operated in CCM when enabled. In some embodiments, the total load current may be monitored and the controller may enable or disable the buck converter based on the measurement. In some embodiments, an output voltage threshold may be used based on monitoring the output voltage to enable or disable at least one converter (e.g., switched capacitor converter, buck converter, switched capacitor converter and buck converter).

Figure 7:
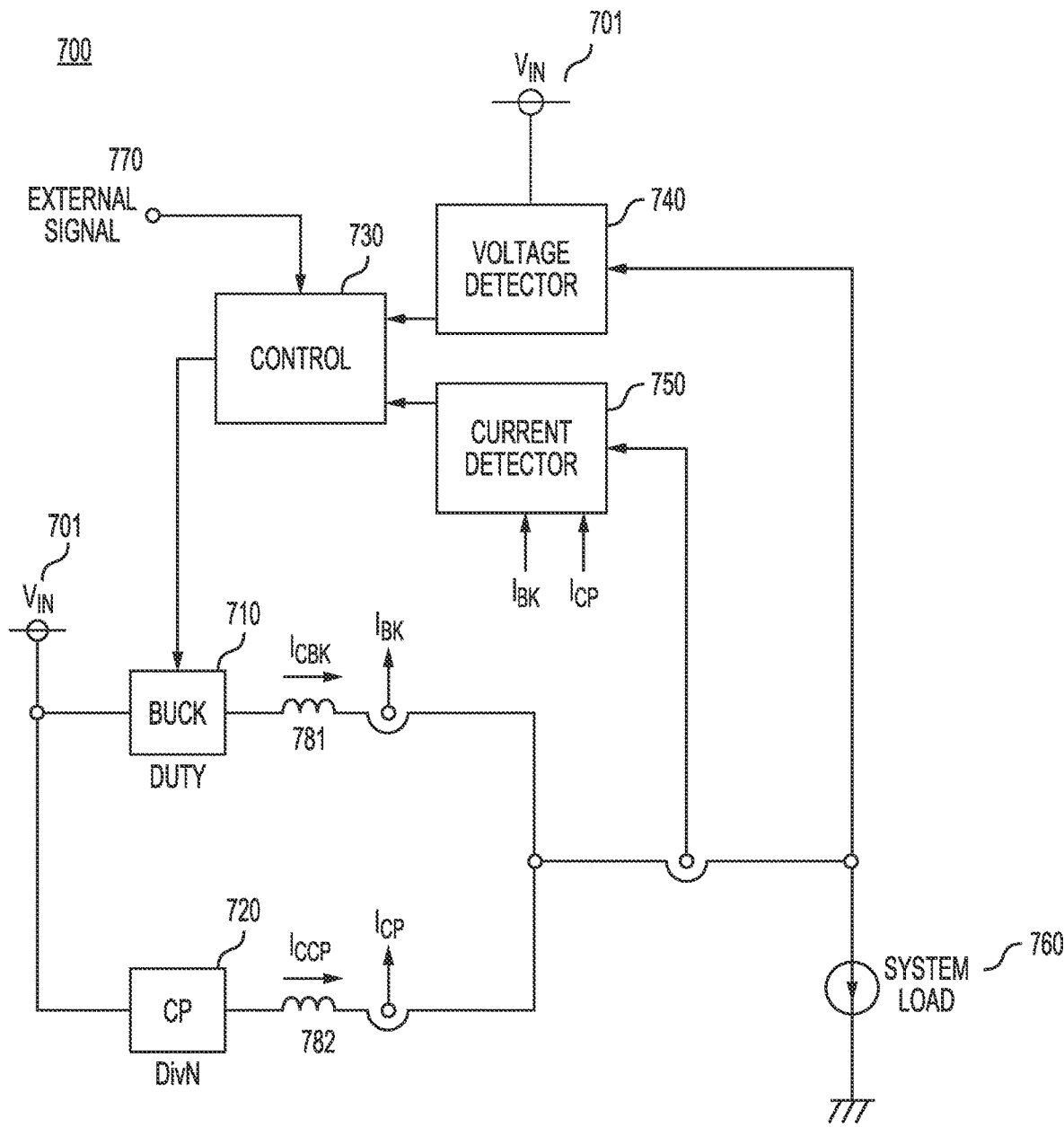
FIG. 7 is a block diagram representative of an exemplary hybrid power converter, consistent with embodiments of the present disclosure.

FIG. 7 is a block diagram representative of an apparatus for a hybrid power converter 700 with both converters in open loop mode, consistent with embodiments of the present disclosure. The apparatus may be comprised of a switched capacitor converter 720 connected to an input voltage 701 at an input terminal. Buck converter 710 may also be connected to the input terminal. Current $I_{CBK}$ from the buck converter 710 may flow through inductor 781. Current $I_{CCP}$ from switched capacitor converter 720 may flow through inductor 782. A controller comprising of control 730, a voltage detector circuit 740, and a current detector circuit 750 may be part of the hybrid power controller to manage operation.

The voltage detector circuit 740 may monitor the output voltage (e.g., the load voltage) compared to the input voltage 701. The voltage detector circuit 740 may detect that the output voltage (e.g., the load voltage) is below or above a target voltage ($V_{target}$) and send a voltage condition to the control 730. Target voltage may represent the voltage threshold in which the buck converter 710 may be charged. The target voltage may be a fixed voltage or relative voltage (e.g., function of input voltage 701). In one non-limiting example, if the switch capacitor converter 720 is operating in a divide-by-three mode, $$V_{target} = \frac{V_{IN}}{3} - 150 \text{ mV}.$$

It is appreciated in the previous example, 150 mV is an arbitrary delta value and any delta value may be used.

In some embodiments, the voltage detector circuit 740 may send a signal to the control 730 that the output voltage is low if the output voltage is less than the target voltage. It is appreciated that the target voltage may have hysteresis. In further embodiments, voltage detector circuit 740 may have output voltage over-voltage or under-voltage functions. Voltage detector circuit 740 may include noise filtering circuitry such as low-pass filter(s) (LPF), high-pass filter(s) (HPF), bandpass filter(s), etc.

The current detector circuit 750 may convert current information into voltage information. The current detector circuit 750 may monitor at least one of the buck converter current $I_{BK}$, switched capacitor converter current $I_{CP}$, or total output current. The current detector circuit 750 may provide the current information to the control 730. In some embodiments, the current detector circuit may include analog-to-digital conversion (ADC).

Control 730 may decide the buck converter operation mode and control the system based on at least one of voltage detector information, current detector information, voltage detector and current detector information, or disable by protection. In further embodiments, the control 730 may use other information like fault condition to decide buck converter operation. In some embodiments, control 730 may determine the buck convertor operation based on an external preparation signal 770 identifying upcoming higher load operation from downstream circuitry (e.g., a system CPU). Control 730 may include a tunable filter such as timing circuitry to determine how long a voltage is below the target voltage before turning on the buck converter 710 and/or count the number of switching cycles the voltage target is below the threshold before turning on the buck converter 710.

In some embodiments, the switched capacitor converter 720 may operate in an open loop and non-regulated mode and may provide power to a load of the hybrid power converter based on an input voltage 701 at the input terminal. The buck converter 710 may operate in an open loop mode and may provide power to the load based on the input voltage 701 of the input terminal. The voltage detector circuit 740 may measure a voltage of the system load 760. The current detector circuit 750 may measure at least one of a current of the switched capacitor converter 720, a current of the buck converter 710, or a current of the system load 760. Based on the measurements, the controller (e.g., control 730) may enable the buck converter 710 to provide power to the load based on at least one of the voltage of the system load 760 or the current of the system load 760.

In some embodiments, the switched capacitor converter may be a Dickson switched capacitor converter. Further, the Dickson switched capacitor converter may comprise of a two-phase switching network. It is to be appreciated that the type and design of the switched capacitor converter may be any type of switched capacitor converter or charge pump with any type of switching network that may benefit the design for the application.

In some embodiments, the buck converter 710 output voltage may be determined by the duty cycle at which the buck converter 710 operates. In some embodiments, buck converter 710 may operate in a peak current mode, where the peak of the inductor current of buck converter 710 is set to a value determined by control 730. In some embodiments, the output voltage may change with respect to the load current and output resistance of the switched capacitor converter and the output voltage may change with respect to the output resistance of the buck converter and the load current. In some embodiments, the output resistance of the buck converter 710 may be less than the output resistance of the switched capacitor converter 720.

In some embodiments, the controller may determine a power consumption state based on the load current of the hybrid power converter. In a low-power consumption state, the buck converter 710 may be disabled. Further, the switched capacitor converter 720 may provide current to the system load 760 during a low-power consumption state. The switched capacitor converter 720 and the buck converter 710 may both provide current to the system load 760 during a mid-power consumption state. In some embodiments, the buck converter 710 may provide current to the system load 760 during a high-power consumption state. In some embodiments, the buck converter 710 may operate in continuous conduction mode (CCM). In some embodiments, the switched capacitor converter 720 may provide current to the system load 760 during the high-power consumption state. For example, the buck converter 710 and switched capacitor converter 720 may share the current supplied to the system load 760.

In some embodiments, a controller (e.g., control 730) may determine the power consumption (e.g., low power consumption, mid power consumption, high power consumption) based on a current of the load measured by current detector circuit 750.

Consistent with disclosed embodiments, the switched capacitor converter 720 may provide an ideal fixed voltage ratio output based on the input voltage 701. The switched capacitor converter 720 may be disabled when the load voltage is higher than the ideal fixed voltage ratio output. In some embodiments, the switched capacitor converter 720 may be disabled to mitigate reverse current through the switched capacitor converter 720. In some embodiments, the buck converter 710 may further comprise of a coupled inductor and a duty cycle of the buck converter 710 may be determined based on an output voltage target and an input voltage ratio. Further, the duty cycle of the buck converter 710 may be determined based on ripple current through the coupled inductor. The duty cycle of the buck converter 710 with N phases may be 1/N shifted by 360/N, where N>0. In some embodiments, the duty cycle of the buck converter operating with two-phases may be substantially 50%.

In some embodiments, the buck converter 710 may comprise of an output impedance that is less than an output impedance of the switched capacitor converter 720. In some embodiments, the controller may receive a preparation signal corresponding to an upcoming heavy load to enable the buck converter 710. In some embodiments, the hybrid power converter may be bidirectional. In some embodiments, the buck converter 710 may comprise of a feedback loop for output protection.

Figure 8:
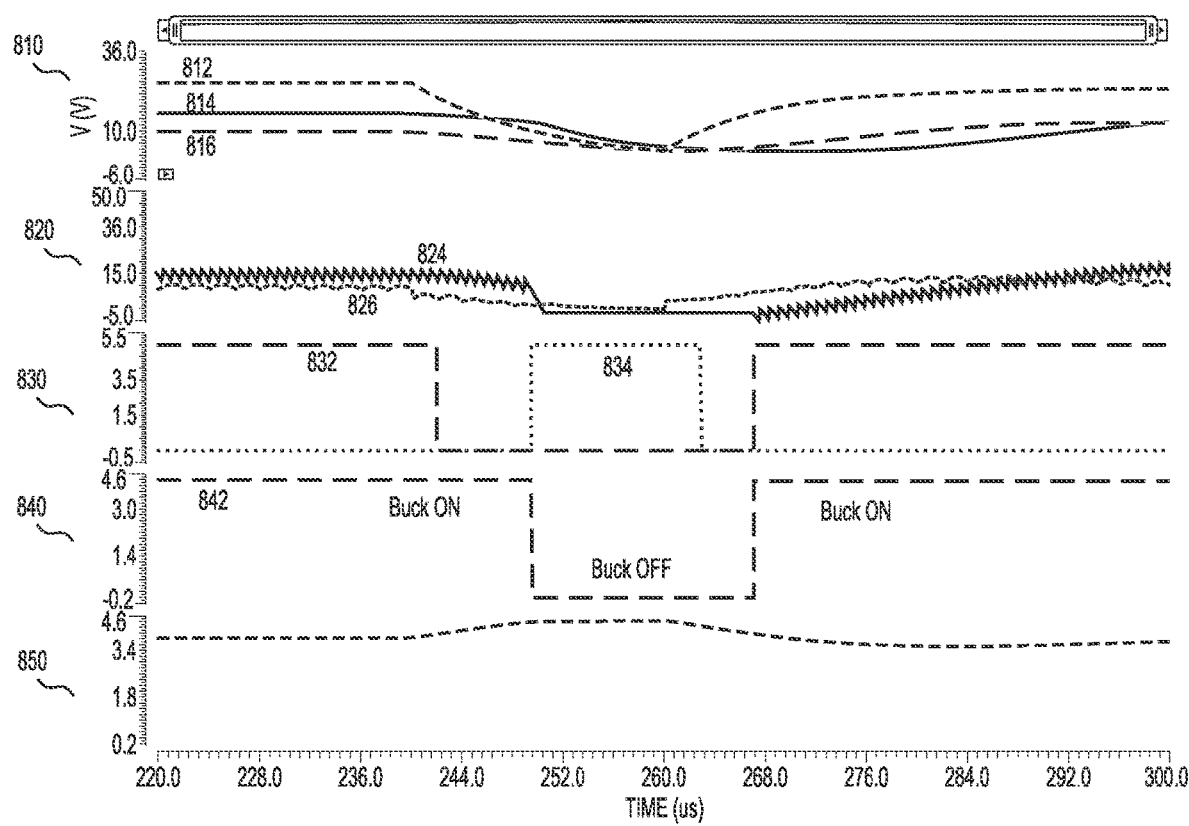
FIG. 8 shows exemplary graphs related to an apparatus for a hybrid power converter, consistent with embodiments of the present disclosure.

FIG. 8 shows exemplary graphs 810, 820, 830, 840, and 850 related to an apparatus for a hybrid power converter, consistent with embodiments of the present disclosure.

Graph 810 shows exemplary load currents of a hybrid power converter overtime, including a total load current 812, a buck converter load current 814, and a switched capacitor converter load current 816. Graph 810 shows filtered current measured at the load point (by L-COUT). Graph 820 shows exemplary load currents over time, corresponding to the same exemplary hybrid power converter of graph 810, including buck converter load current 824 and switched capacitor converter load current 826. Graph 820 shows current measured at the inductor of each of the buck converter and the switched capacitor converter.

Graph 830 shows exemplary logic signal waveforms of a hybrid power converter overtime. Signal 832 may be a waveform generated by voltage detector circuit (e.g., voltage detector circuit 740 of FIG. 7) over time, representing above or below the target voltage level. In this example, when the waveform is high (i.e., high voltage amplitude), $V_{OUT}$ is lower than the target voltage. Signal 834 may be a waveform generated by the control (e.g., control 730 of FIG. 7) receiving current information from the current detector circuit (e.g., current detector circuit 750 of FIG. 7) over time. In this example, when the waveform is high (i.e., high voltage amplitude), the load (e.g., system load 760 in FIG. 7) may be light. Control (e.g., control 730 of FIG. 7) may decide buck converter operation (e.g., buck converter 710 of FIG. 7) according to signals 832 and 834. Graph 850 shows an exemplary measured output voltage $V_{OUT}$ overtime.

Graph 840 shows an exemplary signal 842 generated by a controller (e.g., control 730 of FIG. 7) to enable or disable a buck converter (e.g., buck converter 710 of FIG. 7) to provide power to a load. As shown in graph 840, signal 842 may enable the buck converter when the signal 832 indicates that the output current $I_{OUT}$ is low or when signal 834 indicates that the load is not light. As shown in graph 840, outside of these conditions, signal 842 may disable the buck converter.

Figure 9:
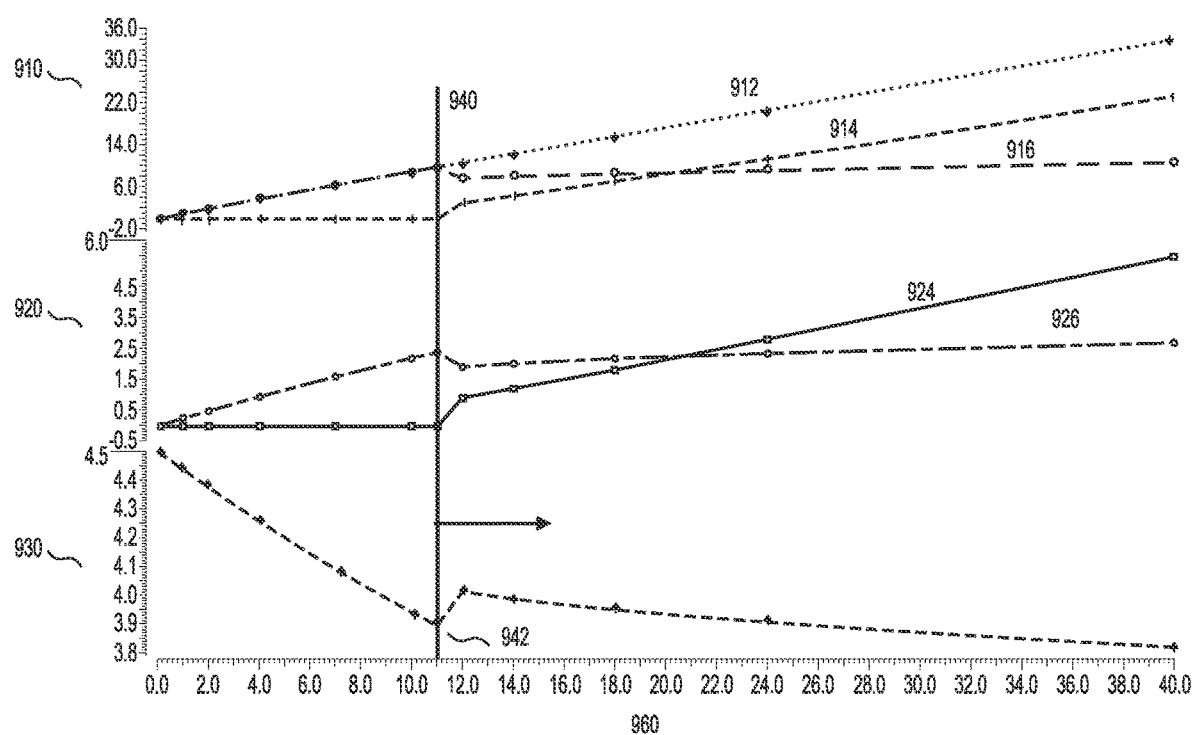
FIG. 9 shows exemplary graphs related to an apparatus for a hybrid power converter, consistent with embodiments of the present disclosure.

FIG. 9 shows exemplary graphs 910, 920, and 930 related to an apparatus for a hybrid power converter, consistent with embodiments of the present disclosure.

Graph 910 shows exemplary output currents of a hybrid power converter over load current 960, including a total output current 912, a buck converter output current 914, and a switched capacitor converter output current 916, consistent with embodiments of the present disclosure. Graph 920 shows exemplary input currents over load current 960, corresponding to the same exemplary hybrid power converter of graph 910, including buck converter input current 924 and switched capacitor input current 926. As shown in graphs 910 and 920, when the load current reaches a threshold value at time 940 (represented by the solid line in between 10 and 12 of the horizontal axis), the hybrid converter enables the buck converter. As the load current increases, the amount of current provided by the buck converter to the load increases.

Graph 930 shows exemplary output voltages $V_{OUT}$ over load current 960. As shown in graph 930, before the output voltage $V_{OUT}$ reaches a threshold value 942, the hybrid power converter may only enable the switched capacitor converter. When the output voltage $V_{OUT}$ reaches threshold value 942, the hybrid converter may enable both the switched capacitor converter and the buck converter to prevent or mitigate reverse current flow from the output of the hybrid power converter.

Figure 10:
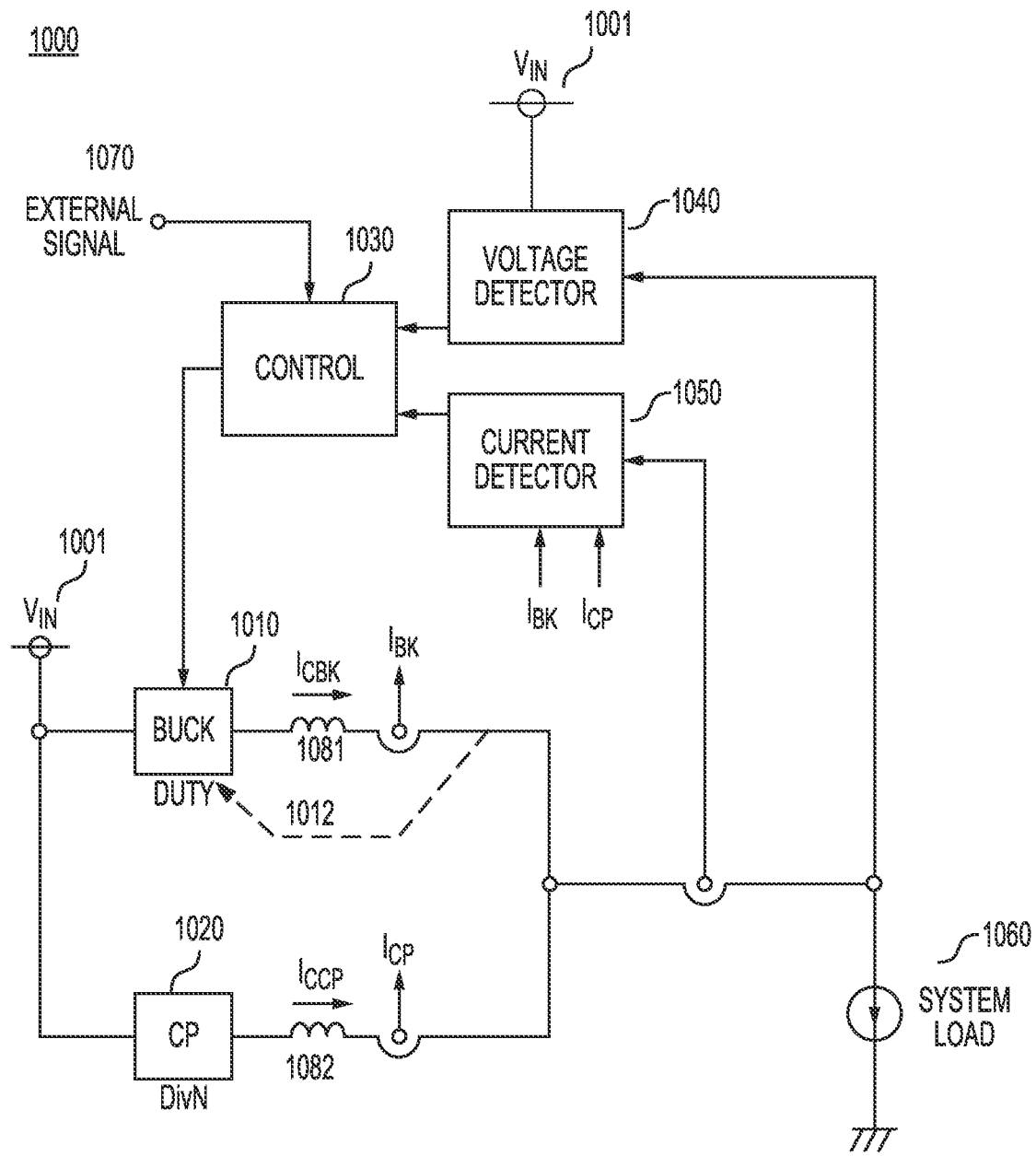
FIG. 10 is a block diagram representative of an apparatus for a hybrid power converter, consistent with embodiments of the present disclosure.

FIG. 10 is a block diagram representative of an apparatus for a hybrid power converter 1000 with a switched capacitor converter 1020 that operates in an open loop and is non-regulated and a buck converter 1010 that operates in a regulated mode, consistent with embodiments of the present disclosure. The apparatus may be comprised of switched capacitor converter 1020 connected to an input voltage 1001 at an input terminal. Buck converter 1010 may also be connected to the input terminal. Current $I_{CBK}$ from the buck converter 1010 may flow through inductor 1081. Current $I_{CCP}$ from switched capacitor converter 1020 may flow through inductor 1082. A controller comprising of control 1030, a voltage detector circuit 1040, and a current detector circuit 1050 may be part of the hybrid power controller to manage operation. The voltage detector circuit 1040 may monitor at least one of the output voltage (e.g., the load voltage) and the input voltage 1001 and provides decision information to control 1030. The current detector circuit 1050 may monitor at least one of the buck converter current, switched capacitor converter current, or total current and provides decision information to control 1030. In some embodiments, the decision information is an analog signal. In other embodiments, the decision information can be a digital signal. Control 1030 may decide buck converter operation based on at least one of voltage detector information or current detector information. Additionally or alternatively, control 1030 may determine buck convertor operation based on an external preparation signal 1070 identifying upcoming higher load operation from downstream circuitry (e.g., a system CPU).

In some embodiments, the switched capacitor converter 1020 may operate in an open loop and non-regulated mode and may provide power to a load of the hybrid power converter based on an input voltage 1001 at the input terminal. The buck converter 1010 may operate in a regulated mode with a feedback line 1012 and provide power to the load based on the feedback line 1012. That is, buck converter 1010 may have a feedback loop through feedback line 1012 to regulate one of the buck converter voltage or the buck converter current. Advantageously, regulated buck converter 1010 may provide a stable output voltage at heavy load conditions.

In some embodiments, buck converter 1010 may operate in a voltage regulated mode that is based upon voltage mode control. A feedback voltage measurement of an output voltage of buck converter 1010 is used to regulate the output voltage of buck converter 1010. In some embodiments, buck converter 1010 may operate in a voltage regulated mode control that is based on a peak current mode control. For example, buck converter 1010 may receive a measurement of a peak inductor current of the buck converter 1010 via feedback line 1012, and compare it to a target value which in part regulates the output voltage. For example, a peak inductor current may be compared against an internal voltage reference that is generated by a reference voltage and output voltage feedback to generate the target threshold current. It is appreciated that the target value may be used for both average and peak current modes.

In some embodiments, buck converter 1010 may operate in a current regulated mode control that is based on feedback from a measurement of an output current of buck converter 1010 to regulate the output current of buck converter 1010.

Buck converter 1010 may have a target voltage or a target current to regulate its output. In some embodiments, buck converter 1010 may be regulated such that its voltage does not exceed the voltage of switched capacitor converter 1020 at no load. Advantageously, regulating buck converter 1010 to meet this target mitigates or prevents reverse current. For example, buck converter 1010 may receive feedback through feedback line 1012, alternatively a feedback circuit could be used instead of a feedback line 1012, and regulate its output voltage or output current based on a target voltage or a target current, respectively. It is appreciated that while a line is shown for feedback line 1012, feedback line 1012 may be representative of a feedback circuit or external circuitry (without wiring) that may provide feedback.

The voltage detector circuit 1040 may measure a voltage of the system load 1060. The current detector circuit 1050 may measure at least one of a current of the switched capacitor converter 1020, a current of the buck converter 1010, or a current of the system load 1060. Voltage detector circuit 1040 and current detector circuit 1050 are described in further detail in embodiments of the present disclosure (see, e.g., FIG. 7 and its corresponding description). Based on the measurements, the controller (e.g., control 1030) may enable the buck converter 1010 to provide power to the load based on at least one of the voltage of the system load 1060 or the current of the system load 1060. Control 1030 has been described in further detail in embodiments of the present disclosure (see, e.g., FIG. 7 and its corresponding description).

In some embodiments, the switched capacitor converter may be a Dickson switched capacitor converter. Further, the Dickson switched capacitor converter may comprise of a two-phase switching network. It is to be appreciated that the type and design of the switched capacitor converter may be any type of switched capacitor converter or charge pump with any type of switching network that may benefit the design for the application.

In some embodiments, the controller determines a power consumption state based on the current of the load of the hybrid power converter. In a low-power consumption state (low power consumption by the load), the buck converter 1010 may be disabled. Further, the switched capacitor converter 1020 may provide current to the system load 1060 during a low-power consumption state. The switched capacitor converter 1020 and the buck converter 1010 may both provide current to the system load 1060 during a mid-power consumption state. In some embodiments, the buck converter 1010 may provide current to the system load 1060 during a high-power consumption state. In some embodiments, the buck converter 1010 may operate in continuous conduction mode (CCM). In some embodiments, the switched capacitor converter 1020 may provide current to the system load 1060 during the high-power consumption state. For example, the buck converter 1010 and switched capacitor converter 1020 may share the current supplied to the system load 1060.

In some embodiments, a controller (e.g., control 1030) may determine the power consumption (e.g., low power consumption, mid power consumption, high power consumption) based on a current of the load measured by current detector circuit 1050.

Consistent with some disclosed embodiments, the switched capacitor converter 1020 may provide an ideal fixed voltage ratio output based on the input voltage 1001. The switched capacitor converter 1020 may be disabled when the load voltage is higher than the ideal fixed voltage ratio output. In some cases, the switched capacitor converter 1020 may be disabled to mitigate reverse current through the switched capacitor converter 1020.

In some embodiments, the buck converter 1010 may comprise of an output impedance that is less than an output impedance of the switched capacitor converter 1020. In some embodiments, the controller may receive a preparation signal corresponding to an upcoming heavy load to enable the buck converter 1010. In some embodiments, the hybrid power converter may be bidirectional. In some embodiments, the feedback loop of buck converter 1010 may provide output protection by opening the high side switch of the buck converter 1010.

Figure 11:
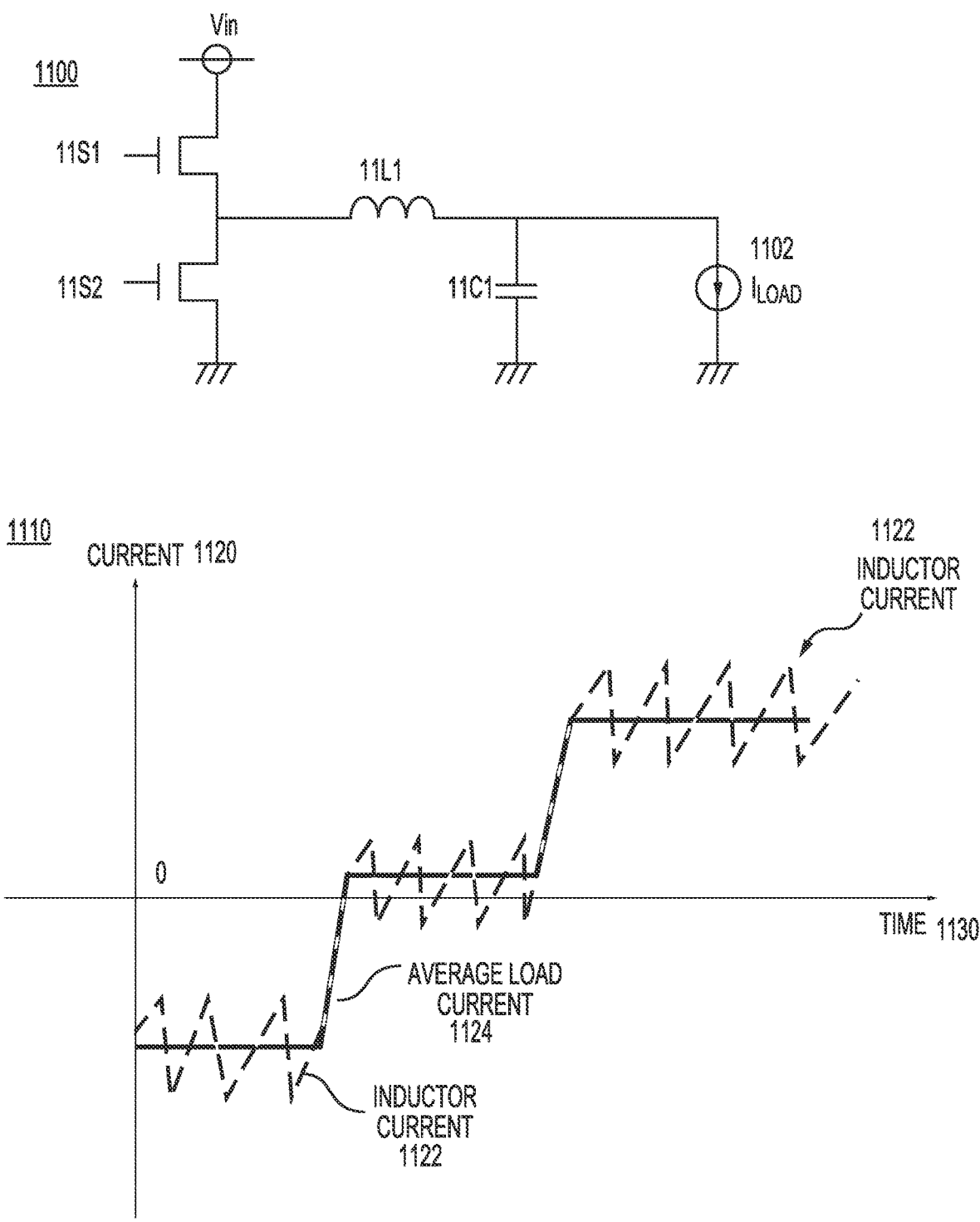
FIG. 11 shows an exemplary buck converter and an exemplary graph, consistent with embodiments of the present disclosure.

FIG. 11 shows an exemplary buck converter 1100 (e.g., of hybrid converter 1000 of FIG. 10) and an exemplary graph 1110 showing current 1120 with respect to time 1130, consistent with embodiments of the present disclosure.

As shown in FIG. 11, buck converter 1100 may include an input voltage $V_{IN}$, switch (e.g., transistor) 11S1, switch (e.g., transistor) 11S2, inductor 11L1, capacitor 11C1, and load 1102.

In some embodiments, a hybrid power converter may experience a drop in efficiency due to a non-CCM condition and a current sink of the inductive switching converter. If the average load current 1124 is less than the half of the inductor current ripple amplitude of inductor current 1122, some energy will sink from its output by the buck converter due to negative inductor current. In some embodiments, this effect may be acceptable for prioritizing a smooth output transition between operating the switched capacitor converter to operating the switched capacitor converter and the buck converter. In some embodiments, this effect may be acceptable for increasing the accuracy of the output voltage during a heavy load condition.

In some embodiments, this effect may be avoided by defining the ON/OFF transition of the buck converter function as $I_{LOAD}(BUCKON)=I_{CP}(BUCKON)+I_{BUCK}(BUCKON)$, where $I_{BUCK}(BUCKON) > I_{CCM}$. $I_{LOAD}$ is the current of the load, $I_{CP}$ is the current of the switched capacitor converter, $I_{BUCK}$ is the current of the buck converter, and $I_{CCM}$ is a CCM current. In other words, the ON/OFF transition refers to the buck converter in an enabled state (ON) or a disabled state (OFF). In some embodiments, this transition definition may increase efficiency at a middle load condition.

Figure 12:
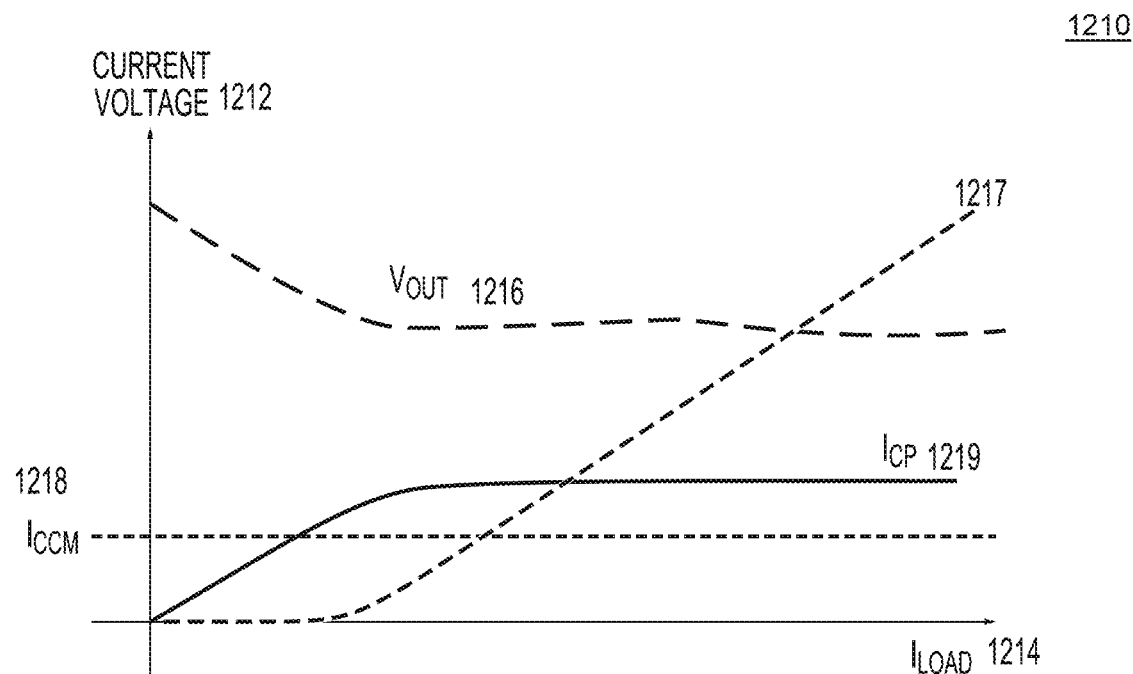
FIG. 12 shows exemplary graphs associated with a hybrid power converter, consistent with embodiments of the present disclosure.
Figure 12:
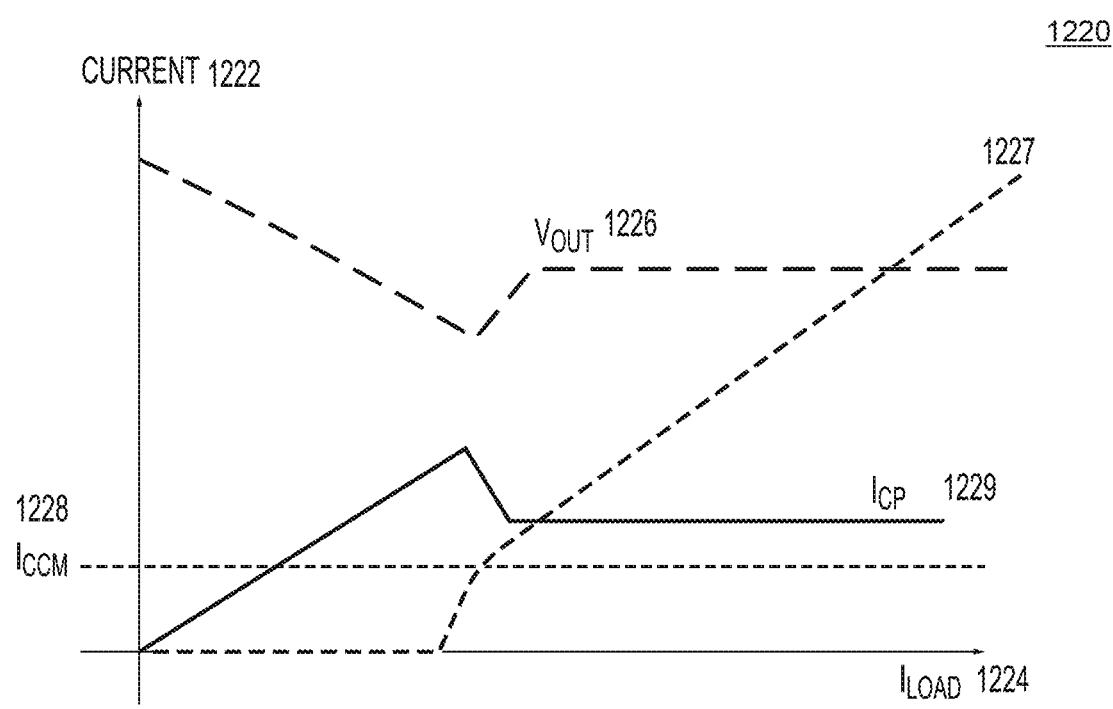

FIG. 12 shows an exemplary graph 1210 and an exemplary graph 1220 associated with a hybrid power converter (e.g., of hybrid converter 1000 of FIG. 10), consistent with embodiments of the present disclosure.

Graph 1210 shows current 1212 with respect to load current $I_{LOAD}$ 1214. Graph 1210 shows a curve 1216 for the output voltage $V_{OUT}$, a curve 1218 for the CCM current Iccm, a curve 1219 for the current of the switched capacitor converter, and a curve 1217 for the buck converter current. In some embodiments, as shown in graph 1210, a regulated buck converter may naturally regulate the output voltage $V_{OUT}$ once the switched capacitor converter voltage sufficiently drops due to the load current. In this case, the buck converter load current 1217 may gradually increased starting at a value less than the CCM current $I_{CCM}$ 1218. This condition may cause a small reverse current, but with a small loss and smooth output voltage $V_{OUT}$ transition.

Graph 1220 shows current 1222 with respect to load current $I_{LOAD}$ 1224. Graph 1220 shows a curve 1226 for the output voltage $V_{OUT}$, a curve 1228 for the CCM current $I_{CCM}$, a curve 1229 for the current of the switched capacitor converter, and a curve 1227 for the buck converter current. In some embodiments, a detector circuit (e.g., current detector circuit 1050 of FIG. 10) to set an exact transition point, higher than the CCM current $I_{CCM}$. In this case, high efficiency may be maintained for all load conditions. In this case, $I_{LOAD}(BUCKON)=I_{CP}+Ibuck$, where $I_{BUCK} > I_{CCM}$. $I_{LOAD}$ is the current of the load, $I_{CP}$ is the current of the switched capacitor converter, $I_{BUCK}$ is the current of the buck converter, and $I_{CCM}$ is a CCM current.

Figure 13:
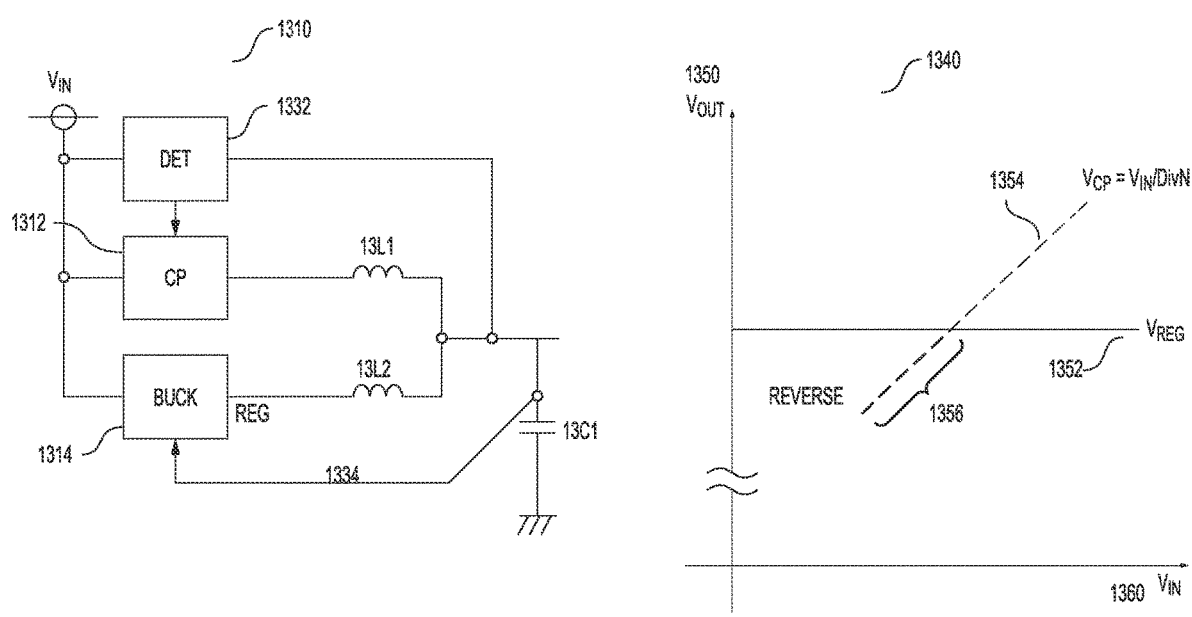
FIG. 13 shows an exemplary hybrid power converter and an exemplary graph, consistent with embodiments of the present disclosure.

FIG. 13 shows an exemplary hybrid power converter 1310 (e.g., of hybrid converter 1000 of FIG. 10) and an exemplary graph 1340, consistent with embodiments of the present disclosure.

Hybrid power converter 1310 may include an input voltage $V_{IN}$, a switched capacitor converter 1312, a buck converter 1314, a detector circuit 1332, an inductor 13L1, an inductor 13L2, a feedback line 1334 and a capacitor 13C1.

Graph 1340 shows output voltage $V_{OUT}$ 1350 with respect to input voltage $V_{IN}$ 1360. Graph 1340 includes a curve 1352 for the regulated buck converter voltage, a curve 1354 for the switched capacitor converter voltage $V_{CP}$ (where $V_{CP}=V_{IN}/DivN$), and a region 1356 corresponding to reverse current flow in hybrid power converter 1310.

As shown in graph 1340, reverse current flow can occur when the voltage of the switched capacitor converter 1312 is less than the voltage of the buck converter 1314. The division ratio ($V_{IN}$/DivN) determines the threshold of the reverse current condition, as discussed in more detail below. Detector circuit 1332 may monitor the voltage of the switched capacitor converter 1312.

Figure 14:
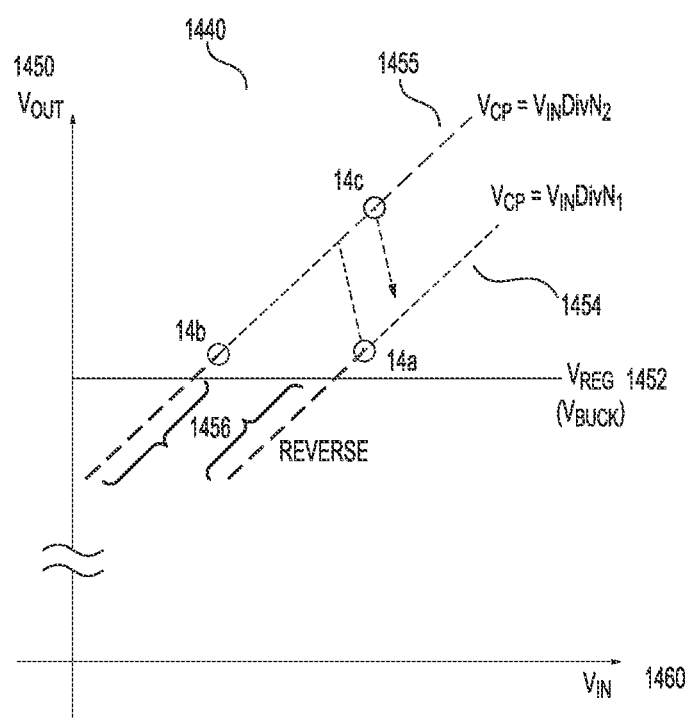
FIG. 14 shows an exemplary graph associated with exemplary hybrid power converter, consistent with embodiments of the present disclosure.

FIG. 14 shows an exemplary graph 1440 associated with exemplary hybrid power converter 1310 of FIG. 13, consistent with embodiments of the present disclosure.

Graph 1440 shows output voltage $V_{OUT}$ 1450 with respect to input voltage $V_{IN}$ 1460. Graph 1440 includes a curve 1452 for the regulated buck converter voltage, a curve 1454 for a first switched capacitor converter voltage $V_{CP1}$ (where $V_{CP1}=V_{IN}/DivN_1$), a curve 1455 for a second switched capacitor converter voltage $V_{CP2}$ (where $V_{CP2}=V_{IN}/DivN_2$), a region 1456 corresponding to reverse current flow in hybrid power converter 1310, and points 14a, 14b, and 14c, which correspond to transition points during operation of hybrid power converter 1310.

As shown in graph 1440, reverse current flow can occur when the voltage of the switched capacitor converter 1312 is less than the voltage of the buck converter 1314. The division ratio ($V_{IN}$/DivN) determines the threshold of the reverse current condition. Detector circuit 1332 may monitor the voltage of the switched capacitor converter 1312. In some embodiments, the detector circuit 1332 may have hysteresis.

At point 14b, based on the output of the detector circuit 1332, hybrid power converter 1310 may disable operation of the switched capacitor converter 1312 to rely fully on operation of the buck converter 1314. At point 14c, hybrid power converter 1310 may change the division ratio of the switched capacitor converter 1312 from $V_{IN}/DivN_2$ to $V_{IN}/DivN_1$. That is, hybrid power converter 1310 may adjust the switched capacitor converter 1312 from a second switched capacitor converter voltage $V_{CP2}$ to a first switched capacitor converter voltage $V_{CP1}$. Similarly, at point 14b, hybrid power converter 1310 may adjust the switched capacitor converter 1312 from a first switched capacitor converter voltage $V_{CP1}$ to a second switched capacitor converter voltage $V_{CP2}$. Advantageously, hybrid power converter may adjust the switched capacitor converter voltage to increase the output voltage and avoid reverse current flow.

Figure 15:
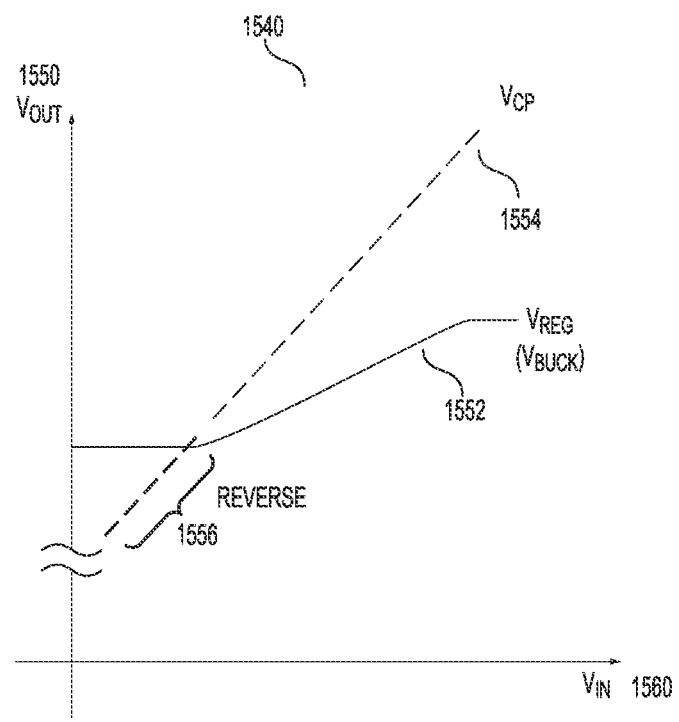
FIG. 15 shows an exemplary graph associated with an exemplary hybrid power converter, consistent with embodiments of the present disclosure.

FIG. 15 shows an exemplary graph 1540 associated with exemplary hybrid power converter 1310 of FIG. 13, consistent with embodiments of the present disclosure.

Graph 1540 shows output voltage $V_{OUT}$ 1550 with respect to input voltage $V_{IN}$ 1560. Graph 1540 includes a curve 1552 for the regulated buck converter voltage, a curve 1554 for the switched capacitor converter voltage $V_{CP}$ (where $V_{CP}=V_{IN}/DivN$), and a region 1556 corresponding to reverse current flow in hybrid power converter 1310.

As shown in graph 1540, reverse current flow can occur when the voltage of the switched capacitor converter 1312 is less than the voltage of the buck converter 1314. The division ratio ($V_{IN}$/DivN) determines the threshold of the reverse current condition. Detector circuit 1332 may monitor the voltage of the switched capacitor converter 1312.

In some embodiments, the regulated buck converter voltage may be partially or fully a function of the input voltage to optimize the system efficiency in the hybrid power converter 1310.

Figure 16:
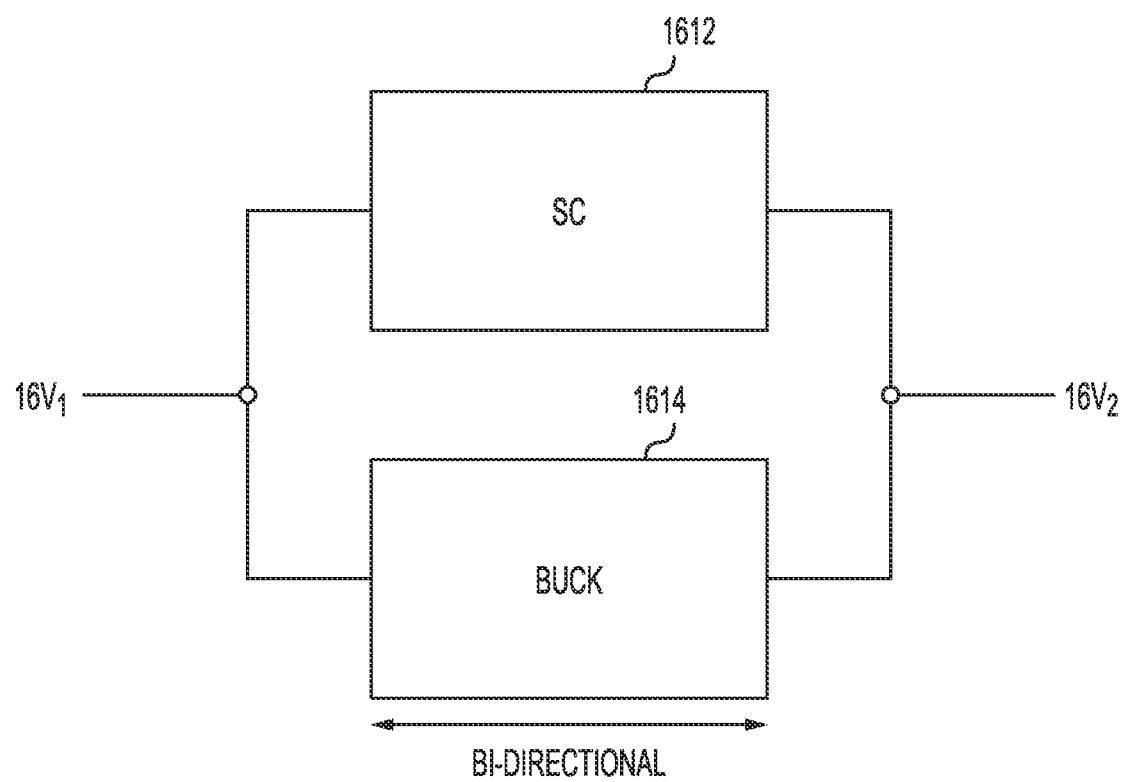
FIG. 16 shows an exemplary configuration of a switched capacitor converter and a buck converter in a hybrid power converter, consistent with embodiments of the present disclosure.

FIG. 16 shows an exemplary configuration of a switched capacitor converter 1612 and a buck converter 1614 in a hybrid power converter, consistent with embodiments of the present disclosure. As shown in FIG. 16, switched capacitor converter 1612 may be in parallel with buck converter 1614. In some embodiments, at least one of switched capacitor converter 1612 or buck converter 1614 may be bidirectional.

That is, through at least one of switched capacitor converter 1612 or buck converter 1614, voltage may flow from voltage 16V₁ to voltage 16V₂ and/or from voltage 16V₂ to voltage 16V₁. In some embodiments, buck converter 1614 may be a boost, buck-boost, flyback, etc.

The embodiments may further be described using the following clauses:

1. An apparatus for a hybrid power converter, said apparatus comprising:
    a switched capacitor converter connected to an input terminal, the switched capacitor converter comprising a plurality of capacitors interconnected by a plurality of switches;
    a buck converter connected to the input terminal, the buck converter comprising an inductor and a plurality of switches connected to the inductor;
    a controller comprising a voltage detector circuit and a current detector circuit;
    wherein:
    the switched capacitor converter operates in an open loop and non-regulated mode and provides power to a load of the hybrid power converter based on an input voltage at the input terminal;
    the buck converter operates in an open loop mode and provides power to the load based on the voltage of the input terminal;
    the voltage detector circuit measures a voltage of the load;
    the current detector circuit measures at least one of a current of the switched capacitor converter, a current of the buck converter, or a current of the load; and
    the controller enables the buck converter to provide power to the load based on at least one of the voltage of the load or the current of the load.

2. The apparatus of clause 1, wherein the switched capacitor converter is a Dickson switched capacitor converter.

3. The apparatus of clause 2, wherein the Dickson switched capacitor converter comprises a two-phase switching network.

4. The apparatus of clause 1, wherein the buck converter operates as a regulated converter.

5. The apparatus of clause 1, wherein the controller determines a power consumption state based on the current of the load of the hybrid power converter.

6. The apparatus of clause 5, wherein the buck converter is disabled during a low-power consumption state.

7. The apparatus of clause 5, wherein the switched capacitor converter provides current to the load during a low-power consumption state.

8. The apparatus of clause 5, wherein the switched capacitor converter and the buck converter provide current to the load during a mid-power consumption state.

9. The apparatus of clause 5, wherein the buck converter provides current to the load during a high-power consumption state.

10. The apparatus of clause 9, wherein the buck converter operates in continuous conduction mode (CCM).

11. The apparatus of clause 9, wherein the switched capacitor converter provides current to the load during the high-power consumption state.

12. The apparatus of clause 1, wherein the switched capacitor converter provides an ideal fixed voltage ratio output based on the input voltage.

13. The apparatus of clause 12, wherein the switched capacitor converter is disabled when the load voltage is higher than the ideal fixed voltage ratio output.

14. The apparatus of clause 12, wherein the switched capacitor converter is disabled to mitigate reverse current through the switched capacitor converter.

15. The apparatus of clause 1, wherein the buck converter further comprises a coupled inductor.

16. The apparatus of clause 15, wherein a duty cycle of the buck converter is determined based on an output voltage target and an input voltage ratio.

17. The apparatus of clause 15, wherein a duty cycle of the buck converter is determined based on ripple current through the coupled inductor.

18. The apparatus of clause 17, wherein the duty cycle of the buck converter with N phases is 1/N shifted by 360/N, where N>0.

19. The apparatus of clause 17, wherein the duty cycle of the buck converter operating with two-phases is substantially 50%.

20. The apparatus of clause 1, wherein the buck converter comprises an output impedance that is less than an output impedance of the switched capacitor converter.

21. The apparatus of clause 1, wherein the controller receives a preparation signal corresponding to an upcoming heavy load to enable the buck converter.

22. The apparatus of clause 1, wherein the hybrid power converter is bidirectional.

23. The apparatus of clause 1, wherein the buck converter comprises a feedback loop for output protection.

24. An apparatus for a hybrid power converter, said apparatus comprising:
- a switched capacitor converter connected to an input terminal;
- a buck converter connected to the input terminal;
- a controller comprising a voltage detector circuit and a current detector circuit;
- wherein:
- the switched capacitor converter operates in an open loop and non-regulated and provides power to a load of the hybrid power converter based on an input voltage at the input terminal;
- the buck converter operates in a regulated mode and provides power to the load based on the input voltage;
- the voltage detector circuit measures a voltage of the load;
- the current detector circuit measures at least one of a current of the switched capacitor converter, a current of the buck converter, or a current of the load; and
- the controller enables the buck converter to provide power to the load based on at least one of the voltage of the load or the current of the load.

25. The apparatus of clause 24, wherein the switched capacitor converter is a Dickson switched capacitor converter.

26. The apparatus of clause 25, wherein the Dickson switched capacitor converter comprises a two-phase switching network.

27. The apparatus of clause 24, wherein the switched capacitor converter provides power to the load during low power consumption by the load.

28. The apparatus of clause 27, wherein the controller determines low power consumption based on a current of the load measured by the current detector circuit.

29. The apparatus of clause 24, wherein the buck converter operates in a voltage regulated mode.

30. The apparatus of clause 29, wherein the voltage regulated mode is based on feedback from a measurement of an output voltage of the buck converter to regulate the output voltage of the buck converter.

31. The apparatus of clause 24, wherein the buck converter operates in a current regulated mode.

32. The apparatus of clause 31, wherein the current regulated mode is based on feedback from a measurement of a current of the buck converter to regulate the output voltage.

33. The apparatus of clause 24, wherein a voltage regulated mode is based on a peak current mode control.

34. The apparatus of clause 24, wherein the buck converter provides power to the load during high power consumption by the load.

35. The apparatus of clause 34, wherein the controller determines high power consumption based on a current of the load measured by the current detector circuit measurement.

36. The apparatus of clause 24, wherein the buck converter comprises an output impedance less than an output impedance of the switched capacitor converter.

37. An apparatus for hybrid power converter, said apparatus comprising:
- a switched capacitor converter connected to an input terminal;
- a buck converter connected to the input terminal;
- a controller comprising a voltage detector circuit and a current detector circuit;
- wherein:
- the switched capacitor converter operates in an open loop and non-regulated mode and provides power to a load of the hybrid power converter based on an input voltage at the input terminal;
- the buck converter operates in a peak current mode and provides power to the load based on the input voltage;
- the voltage detector circuit measures a voltage of the load;
- the current detector circuit measures at least one of a current of the switched capacitor converter, a current of the buck converter current, or a current of the load; and
- the controller enables the buck converter to provide power to the load based on at least one of the voltage of the load or the current of the load.

38. An apparatus for hybrid power converter, said apparatus comprising:
- a switched capacitor converter connected to an input terminal;
- a buck converter connected to the input terminal;
- a controller comprising a voltage detector circuit and a current detector circuit;
- wherein:
- the switched capacitor converter operates in an open loop and non-regulated mode and provides power to a load of the hybrid power converter based on an input voltage at the input terminal;
- the buck converter operates in a peak current regulated mode and provides power to the load based on the input voltage;
- the voltage detector circuit measures a voltage of the load and the current detector circuit measures at least one of a current of the switched capacitor converter, a current of the buck converter, and a current of the load; and
- the controller enables the buck converter to provide power to the load based on at least one of the voltage of the load or the current of the load.

39. An apparatus for hybrid power converter, said apparatus comprising:
- a switched capacitor converter connected to an input terminal;
- a buck converter connected to the input terminal;

a controller comprising a voltage detector circuit and a current detector circuit;

wherein:

the switched capacitor converter operates in an open loop and non-regulated mode and provides power to a load based on an input voltage at the input terminal;

the buck converter operates in a voltage mode control and provides power to the load based on the input voltage;

the voltage detector circuit measures a voltage of the load and the current detector circuit measures at least one of a current of the switched capacitor converter, a current of the buck converter, and a current of the load; and the controller enables the buck converter to provide power to the load based on at least one of the voltage of the load voltage or the current of the load.

40. An apparatus for hybrid power converter, said apparatus comprising:

a switched capacitor converter connected to an input terminal;

a buck converter connected to the input terminal;

a controller comprising a voltage detector circuit and a current detector circuit;

wherein:

wherein the switched capacitor converter operates in an open loop and non-regulated mode and provides power to a load of the hybrid power converter based on an input voltage at the input terminal;

the buck converter provides power to the load based on the input voltage;

the buck converter comprises an output resistance that is less than an output resistance of the switched capacitor converter;

the voltage detector circuit measures a voltage of the load voltage;

the current detector circuit measures at least one of a current of the switched capacitor converter, a current of the buck converter, and a current of the load; and the controller enables the buck converter to provide power to the load based on at least one of the voltage of the load or the current of the load.

It will be appreciated that the embodiments of the present disclosure are not limited to the exact construction that has been described above and illustrated in the accompanying drawings, and that various modifications and changes may be made without departing from the scope thereof.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or control signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Some or all aspects of the invention may be implemented in hardware or software, or a combination of both (e.g., programmable logic arrays). Unless otherwise specified, the methods included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code are applied to input data to perform the functions described herein and generate output information. The output information is applied to one or more output devices, in known fashion.

Each such computer program may be implemented in any desired computer language (including machine, assembly, or high level procedural, logical, object oriented programming languages or a custom language/script) to communicate with a computer system, and may be implemented in a distributed manner in which different parts of the computation specified by the software are performed by different processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently, or permanently), the storage media or device being readable by a general or special purpose programmable computer for configuring and operating the computer when the storage media or device is read by the computer system to perform the procedures described above. The inventive system may also be considered to be implemented as a non-transitory computer-readable storage medium, configured with a computer program, where the storage medium so configured causes a computer system to operate in a specific or predefined manner to perform the functions described above.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be appreciated that the appended claims are intended to cover all modifications and/or changes as fall within claimed subject matter.

It is to be appreciated that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. Therefore, even if some or all of the dependent claims have been written with single dependency, it is to be appreciated that the present application provides full support for such claims to be multiply dependent on some or all of the other claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. An apparatus for a hybrid power converter, said apparatus comprising:
a switched capacitor converter connected to an input terminal, the switched capacitor converter comprising a plurality of capacitors interconnected by a plurality of switches;
a buck converter connected to the input terminal, the buck converter comprising an inductor and a plurality of switches connected to the inductor;
a controller comprising a voltage detector circuit and a current detector circuit;
wherein:
the switched capacitor converter operates in an open loop and non-regulated mode and provides power to a load of the hybrid power converter based on an input voltage at the input terminal;
the buck converter operates in an open loop mode and provides power to the load based on the voltage of the input terminal;
the voltage detector circuit measures a voltage of the load;
the current detector circuit measures at least one of a current of the switched capacitor converter, a current of the buck converter, or a current of the load; and
the controller enables the buck converter to provide power to the load based on at least one of the voltage of the load or the current of the load.

2. The apparatus of claim 1, wherein the switched capacitor converter is a Dickson switched capacitor converter.

3. The apparatus of claim 2, wherein the Dickson switched capacitor converter comprises a two-phase switching network.

4. The apparatus of claim 1, wherein the buck converter operates as a regulated converter.

5. The apparatus of claim 1, wherein the controller determines a power consumption state based on the current of the load of the hybrid power converter.

6. The apparatus of claim 5, wherein the buck converter is disabled during a low-power consumption state.

7. The apparatus of claim 5, wherein the switched capacitor converter provides current to the load during a low-power consumption state.

8. The apparatus of claim 5, wherein the switched capacitor converter and the buck converter provide current to the load during a mid-power consumption state.

9. The apparatus of claim 5, wherein the buck converter provides current to the load during a high-power consumption state.

10. The apparatus of claim 9, wherein the buck converter operates in continuous conduction mode (CCM).

11. The apparatus of claim 9, wherein the switched capacitor converter provides current to the load during the high-power consumption state.

12. The apparatus of claim 1, wherein the switched capacitor converter provides an ideal fixed voltage ratio output based on the input voltage.

13. The apparatus of claim 12, wherein the switched capacitor converter is disabled when the load voltage is higher than the ideal fixed voltage ratio output.

14. The apparatus of claim 12, wherein the switched capacitor converter is disabled to mitigate reverse current through the switched capacitor converter.

15. The apparatus of claim 1, wherein the buck converter further comprises a coupled inductor.

16. The apparatus of claim 15, wherein a duty cycle of the buck converter is determined based on an output voltage target and an input voltage ratio.

17. The apparatus of claim 15, wherein a duty cycle of the buck converter is determined based on ripple current through the coupled inductor.

18. The apparatus of claim 17, wherein the duty cycle of the buck converter with N phases is 1/N shifted by 360/N, where N>0.

19. The apparatus of claim 17, wherein the duty cycle of the buck converter operating with two-phases is substantially 50%.

20. The apparatus of claim 1, wherein the buck converter comprises an output impedance that is less than an output impedance of the switched capacitor converter.

21. The apparatus of claim 1, wherein the controller receives a preparation signal corresponding to an upcoming heavy load to enable the buck converter.

22. The apparatus of claim 1, wherein the hybrid power converter is bidirectional.

23. The apparatus of claim 1, wherein the buck converter comprises a feedback loop for output protection.

24. An apparatus for a hybrid power converter, said apparatus comprising:
- a switched capacitor converter connected to an input terminal;
- a buck converter connected to the input terminal;
- a controller comprising a voltage detector circuit and a current detector circuit;

wherein:
- the switched capacitor converter operates in an open loop and non-regulated and provides power to a load of the hybrid power converter based on an input voltage at the input terminal;
- the buck converter operates in a regulated mode and provides power to the load based on the input voltage;
- the voltage detector circuit measures a voltage of the load;
- the current detector circuit measures at least one of a current of the switched capacitor converter, a current of the buck converter, or a current of the load; and
- the controller enables the buck converter to provide power to the load based on at least one of the voltage of the load or the current of the load.

25. The apparatus of claim 24, wherein the switched capacitor converter is a Dickson switched capacitor converter.

26. The apparatus of claim 25, wherein the Dickson switched capacitor converter comprises a two-phase switching network.

27. The apparatus of claim 24, wherein the switched capacitor converter provides power to the load during low power consumption by the load.

28. The apparatus of claim 27, wherein the controller determines low power consumption based on a current of the load measured by the current detector circuit.

29. The apparatus of claim 24, wherein the buck converter operates in a voltage regulated mode.

30. The apparatus of claim 29, wherein the voltage regulated mode is based on feedback from a measurement of an output voltage of the buck converter to regulate the output voltage of the buck converter.

31. The apparatus of claim 24, wherein the buck converter operates in a current regulated mode.

32. The apparatus of claim 31, wherein the current regulated mode is based on feedback from a measurement of a current of the buck converter to regulate the output voltage.

33. The apparatus of claim 24, wherein a voltage regulated mode is based on a peak current mode control.

34. The apparatus of claim 24, wherein the buck converter provides power to the load during high power consumption by the load.

35. The apparatus of claim 34, wherein the controller determines high power consumption based on a current of the load measured by the current detector circuit measurement.

36. The apparatus of claim 24, wherein the buck converter comprises an output impedance less than an output impedance of the switched capacitor converter.

* * * * *